US011858801B2

(12) United States Patent
Rigdon et al.

(10) Patent No.: US 11,858,801 B2
(45) Date of Patent: Jan. 2, 2024

(54) FUEL TRANSFER STATION AND REFILLABLE FUEL CELL FOR FUEL TRANSFER STATION

(71) Applicant: WORTHINGTON CYLINDERS CORPORATION, Worthington, OH (US)

(72) Inventors: William Rigdon, Baltimore, MD (US); Daniel J. White, Middle River, MD (US); Matthew J. Velderman, Jr., Baltimore, MD (US); Derek Marchanti, Nottingham, MD (US); Gary Hill, Red Lion, PA (US)

(73) Assignee: Worthington Cylinders Corporation, Worthington, OH (US)

( * ) Notice: Subject to any disclaimer, the term of this patent is extended or adjusted under 35 U.S.C. 154(b) by 0 days.

(21) Appl. No.: 17/964,991

(22) Filed: Oct. 13, 2022

(65) Prior Publication Data

US 2023/0312329 A1 Oct. 5, 2023

Related U.S. Application Data

(63) Continuation of application No. 17/087,821, filed on Nov. 3, 2020, now abandoned, which is a (Continued)

(51) Int. Cl.
*F17C 5/00* (2006.01)
*B67D 7/04* (2010.01)
*F17C 5/02* (2006.01)

(52) U.S. Cl.
CPC .................. *B67D 7/04* (2013.01); *F17C 5/00* (2013.01); *F17C 5/02* (2013.01); (Continued)

(58) Field of Classification Search
CPC ..... B67D 7/04; F17C 5/00; F17C 5/02; F17C 2201/0109; F17C 2201/056; (Continued)

(56) References Cited

U.S. PATENT DOCUMENTS 2,732,103 A 1/1956 Wright
4,134,491 A 1/1979 Turillon et al.
(Continued)

FOREIGN PATENT DOCUMENTS

DE 10232622 2/2004
DE 102014213441 1/2016
(Continued)

OTHER PUBLICATIONS

Supplementary Partial EP Search Report; EP 18853897; dated May 14, 2021; 13 pgs.
(Continued)

*Primary Examiner* — P. Macade Nichols
(74) *Attorney, Agent, or Firm* — TUCKER ELLIS LLP

(57) ABSTRACT

A fuel transfer station may provide for the refilling of fuel canisters providing fuel to combustion powered equipment. The fuel transfer station may include a base, a frame coupled to the base, a first connection port and a second connection port provided in the base, and fluid flow lines connecting the first connection port and the second connection port. A supply tank may be supported by the frame and detachably connected to the first connection port. A fuel canister to be refilled may be detachably connected to the second connection port. Fuel contained in the supply tank may be selectively supplied to the fuel canister through the fluid flow lines in response to a pressure gradient drawing the fuel into the fuel canister.

18 Claims, 29 Drawing Sheets

Related U.S. Application Data continuation of application No. 16/124,481, filed on Sep. 7, 2018, now Pat. No. 10,889,487.

(60) Provisional application No. 62/556,696, filed on Sep. 11, 2017.

(52) U.S. Cl.
CPC ........................... *F17C 2201/0109* (2013.01); *F17C 2201/032* (2013.01); *F17C 2201/054* (2013.01); *F17C 2201/056* (2013.01); *F17C 2201/058* (2013.01); *F17C 2205/0107* (2013.01); *F17C 2205/0115* (2013.01); *F17C 2205/0329* (2013.01); *F17C 2205/0332* (2013.01); *F17C 2205/0335* (2013.01); *F17C 2205/0382* (2013.01); *F17C 2221/035* (2013.01); *F17C 2223/0153* (2013.01); *F17C 2223/035* (2013.01); *F17C 2225/0153* (2013.01); *F17C 2225/035* (2013.01); *F17C 2227/0142* (2013.01); *F17C 2227/0304* (2013.01); *F17C 2260/032* (2013.01); *F17C 2270/0545* (2013.01); *F17C 2270/0763* (2013.01)

(58) Field of Classification Search
CPC ...... F17C 2205/0329; F17C 2205/0332; F17C 2205/0335; F17C 2221/035; F17C 2223/0153; F17C 2223/035; F16K 17/0406; F16K 17/0466
See application file for complete search history.

(56) References Cited

U.S. PATENT DOCUMENTS

| | | | | |
|---|---|---|---|---|
| 5,363,666 | A | 11/1994 | Tieken | |
| 5,704,967 | A | 1/1998 | Tom et al. | |
| 6,196,016 | B1 | 3/2001 | Knowles et al. | |
| 2006/0006108 | A1 | 1/2006 | Arias et al. | |
| 2006/0071009 | A1 | 4/2006 | Kaye | |
| 2015/0360930 | A1 * | 12/2015 | Daniels ................ | B67D 7/0288 222/56 |
| 2016/0284153 | A1 | 9/2016 | Tansey | |
| 2021/0070604 | A1 * | 3/2021 | Rigdon ..................... | F17C 5/00 |

FOREIGN PATENT DOCUMENTS

| | | |
|---|---|---|
| GB | 814027 | 5/1959 |
| GB | 1294881 | 11/1972 |
| WO | 2005071306 | 8/2005 |
| WO | 2012071593 | 5/2012 |

OTHER PUBLICATIONS

Extended EP Search Report; EP 21185206.6 ; dated Aug. 11, 2021; 7 pgs.

* cited by examiner

FUEL TRANSFER STATION AND REFILLABLE FUEL CELL FOR FUEL TRANSFER STATION

CROSS REFERENCE TO RELATED APPLICATION

This application is a Continuation patent application that claims the benefit of and priority to U.S. Non-provisional application Ser. No. 17/087,821 filed on Nov. 3, 2020. Application Ser. No. 17/087,821 claims the benefit of and priority to U.S. Pat. No. 10,889,487 filed on Sep. 7, 2018. U.S. Pat. No. 10,889,487 claims the benefit of and priority to U.S. Provisional Application No. 62/556,696, filed on Sep. 11, 2017. The entireties of the aforementioned applications are incorporated herein by reference.

FIELD

This document relates, generally, to a refillable fuel cell, and in particular, to refillable fuel cell and a transfer station transferring fuel to the refillable fuel cell.

BACKGROUND

Power tools may be driven in response to power supplied from, for example, an electrical power source supplying power to the tool through a cord, a compressed air source supplying compressed air to the tool through a hose, a battery supplying stored electrical power to the tool, fuel supplied from a tank for combustion by, for example, an engine of the tool, and the like. Tools driven by electrical power and/or compressed air may operate, essentially, as long as a source of power is available, but may be cumbersome due to the attachment of the tool to the cord and/or the hose supplying power to the tool, and/or may be limited by the availability of the electrical power and/or compressed air within the range of the tool afforded by the length of the cord and/or the hose. The use of a battery to supply power to the tool may eliminate the need for a cord or hose attachment of the tool to the power source, but may have a relatively limited operating period within the life of the battery, and may be relatively heavy and less nimble. Cordless, combustion powered tools may provide an alternative having increased power and/or run time compared to corded and/or battery powered tools.

SUMMARY

In one aspect, a closed loop fuel transfer station may include a first connection port, a second connection port, a fluid flow line connecting the first connection port and the second connection port, the fluid flow line having an inlet portion proximate the first connection port and an outlet portion proximate the second connection port, a first coupler configured to detachably couple a supply tank to the fluid flow line at the first connection port, a second coupler configured to detachably couple a refillable fuel canister to the fluid flow line at the second connection port, a first check valve at the inlet portion of the fluid flow line, a second check valve at the outlet portion of the fluid flow line, and a pump in fluid communication with the fluid flow line, so as to selectively pressurize the fluid flow line.

In some implementations, the fuel transfer station may include a pressure relief valve provided in the fluid flow line, between the first check valve and the second check valve. The pressure relief valve may be configured to selectively release pressure from the fluid flow line in response to detection of a pressure in the fluid flow line that is greater than or equal to a previously defined pressure level, the previously defined pressure level corresponding to an overfill point of the refillable fuel canister.

In some implementations, the first connection port and the first coupler may be configured to detachably couple a plurality of different supply tanks to the fluid flow line, the plurality of different supply tanks having different capacities.

In some implementations, the second connection port and the second coupler are configured to detachably couple a plurality of different fuel canisters to the fluid flow line, the plurality of different fuel canisters having different capacities.

In some implementations, the second connection port may include a keying feature, the keying feature including a contoured inner section defined on an inner peripheral portion of the second connection port. The contoured inner section having a contour corresponding to a contour of a contoured outer section defined on a corresponding outer peripheral portion of the fuel canister. In some implementations, alignment of the contoured outer section of the fuel canister with the contoured inner section of the second connection port may define an insertion orientation for coupling the fuel canister in the second connection port.

In some implementations, the second connection portion may include a keying feature, the keying feature including a contoured inner section defined on an inner peripheral portion of the second connection port. The contoured inner section may be configured to selectively engage with a movable release pad on a corresponding outer peripheral portion of the fuel canister.

In some implementations, the fuel transfer station may include a release mechanism extending into the second connection port. The release mechanism may include a release arm, and a release button at a proximal end portion of the release arm. A distal end portion of the release arm is configured to depress the release pad on the outer peripheral portion of the fuel canister in response to actuation of the release button at the proximal end portion of the release arm, releasing engagement of the contoured inner section and the release pad to release the fuel canister from the first connection port.

In another aspect, a refillable fuel canister may include a canister body, wherein at least a portion of the canister body is translucent such that an interior of the fuel canister is visible through the translucent portion of the canister body, a cap portion coupled to an end portion of the canister body, and a coupler in the cap portion, the coupler including a stop mechanism that selectively restricts the flow of fluid through the coupler.

In some implementations, the fuel canister may also include compressible material received in the interior of the canister body. A volume occupied by the compressible material at a first pressure in the interior of the fuel canister may be greater than a volume occupied by the compressible material at a second pressure in the interior of the fuel canister, the second pressure being greater than the first pressure.

In some implementations, the compressible material may include a plurality of masses of the compressible material moving freely within the interior of the fuel canister. In some implementations, the compressible material may include a plurality of pieces of compressible material arranged along an inner circumferential surface of the canister body.

In another aspect, a fuel transfer device may include a cylinder, a piston reciprocally received in the cylinder, an inlet portion in communication with an interior portion of the cylinder, a check valve coupled to the inlet portion, and a fuel transfer nozzle installed at an outlet portion of the cylinder, the fuel transfer nozzle including a nozzle tip at an outlet portion of the fuel transfer nozzle. The inlet portion may be configured to be removably coupled to a supply tank. The nozzle tip of the fuel transfer nozzle may be configured to be removably coupled in a fill valve of a fuel canister.

In some implementations, a reciprocal movement of the piston in the cylinder in a first direction may draw fuel from the supply tank and into the interior of the cylinder through the inlet portion, and a reciprocal movement of the piston in the cylinder in a second direction, opposite the first direction, may draw fuel from the interior of the cylinder, through the nozzle tip of the fuel transfer adapter, and into the fuel canister through the fill valve.

In some implementations, the fuel transfer nozzle may include a fuel flow path guiding fuel through the fuel transfer nozzle, and a spring loaded valve positioned within the fuel flow path of the fuel to selectively control a flow of fuel along the fuel flow path through the fuel transfer nozzle. In response to an external force applied to the nozzle tip, the spring loaded valve may be compressed so as to open the fuel flow path, and to allow fuel to flow from the interior portion of the cylinder and out through the nozzle tip of the fuel flow nozzle. In response to removal of the external force applied to the nozzle tip, the spring loaded valve may close the fuel flow path, so as to restrict the flow of fuel through the fuel flow nozzle.

In some implementations, the fuel flow nozzle may also include a lubrication port in communication with the fuel flow path.

In some implementations, the check valve may be coupled between a first end portion of the inlet portion and an outlet portion of the supply tank. In some implementations, the check valve may be coupled between a second end portion of the inlet portion and the piston.

The details of one or more implementations are set forth in the accompanying drawings and the description below. Other features will be apparent from the description and drawings, and from the claims.

BRIEF DESCRIPTION OF THE DRAWINGS

In FIGS. 13A and 13C, the fuel transfer nozzle is in an unactuated state, and FIGS. 13B and 13D illustrate the fuel transfer nozzle in an actuated state.

In FIG. 15A, the fuel transfer nozzle and the fill valve are in a disengaged state. In FIG. 15B, the fuel transfer nozzle and the fill valve are in an engaged state.

DETAILED DESCRIPTION

Figure 1A:
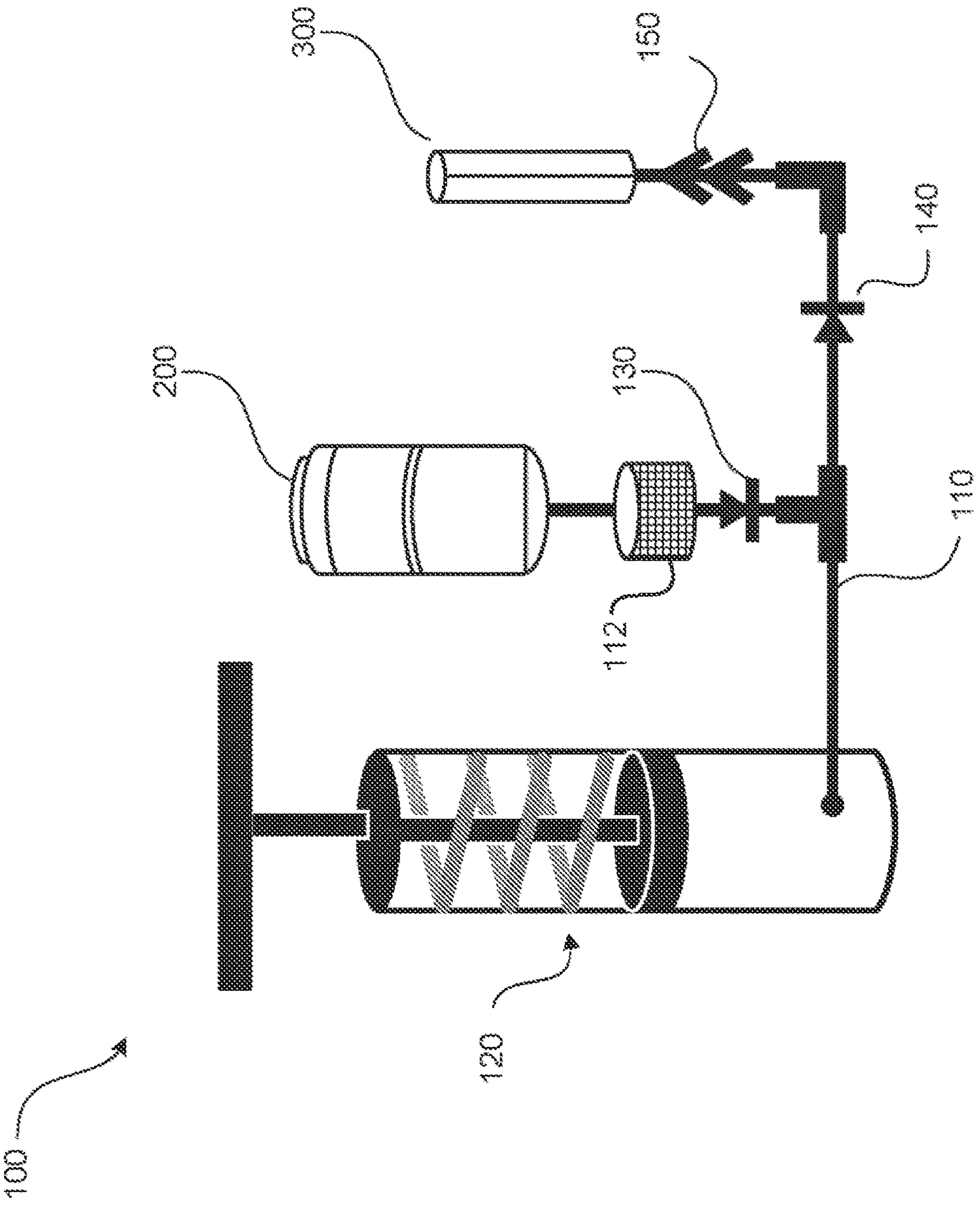
FIGS. 1A and 1B are schematic views of example fuel transfer stations, in accordance with implementations described herein.

A fuel cell, or fuel canister, for a combustion powered tool, in accordance with implementations described herein, may be removably coupled to a combustion powered tool. The fuel cell may be removed from the tool, and coupled to a fuel transfer station. A fuel transfer station, in accordance with implementations described herein, may provide for refilling, or replenishment, of fuel in the fuel cell, so that the refilled fuel cell, or fuel canister, may be re-attached to the tool. In some implementations, the fuel cell may be refilled or replenished with a liquid hydrocarbon fuel such as, for example, propane, from the fuel transfer station. In some implementations, the fuel cell, or fuel canister, may be received in a housing of the tool. In some implementations, the fuel cell, or fuel canister, may be coupled to a housing of the tool. In some implementations, a metering valve coupled to the fuel cell, or fuel canister, may dispense a previously defined amount, or volume, of liquid fuel from the fuel cell, or fuel canister, to the tool in response to an actuation of the tool. In some implementations, a flow through valve coupled to the fuel cell, or fuel canister, may provide a substantially continuous flow of fuel from the fuel cell, or fuel canister, to the tool for sustained operation of the tool.

Numerous different types of tools may be powered by a hydrocarbon fuel, such as, for example, propane, delivered by a fuel cell, or fuel canister, and fuel transfer station, in accordance with implementations described herein. For example, handheld combustion powered equipment, such as, for example, an impact tool, a crimping tool, a fastening tool, and the like may receive a metered flow of fuel provided by a refillable fuel canister for operation, in accordance with implementations described herein. Other types of combustion powered equipment, such as, for example, cutting tools, surface finishing tools, driving tools, and the like, as well as equipment such as lawnmowers, blowers, trimmers, power washers, and the like, may receive a continuous, or free flow of fuel provided by a refillable fuel canister, in accordance with implementations described herein. A fuel canister, and a fuel transfer station, in accordance with implementations described herein, may allow a depleted fuel canister to be refilled and reconnected to the combustion powered equipment, rather than discarded and replaced with a new fuel canister. This may provide substantial cost savings, may enhance user convenience and utility, and may reduce waste. Additionally, operation of this type of combustion powered equipment on a hydrocarbon based fuel such as propane, rather than a traditional gasoline powered arrangement, may allow for indoor operation of the combustion powered equipment, further enhancing user convenience and utility.

In some situations, a main tank, or a supply tank, and a fuel canister to be refilled may be connected in an open loop fuel transfer system, to provide for refilling of the fuel canister from the supply tank. In many situations, the supply tank and the fuel canister may be at substantially the same pressure and temperature, generating a vapor lock condition between the supply tank and the fuel canister, and inhibiting fluid flow between the supply tank and the fuel canister. In this situation, a flow of fluid, for example, a flow of fuel in a liquid state, from the supply tank to the fuel canister, may be facilitated by, for example, allowing a direct vent to atmosphere (or to a secondary pressure vessel) from the fuel canister. This venting to the atmosphere may lower the pressure in the fuel canister, generating a pressure differential that allows for fluid flow from the supply tank to the fuel canister. However, this venting of a fluid fuel at high vapor pressure may create a combustible mix with air, may pose a freeze/frostbite hazard due to off-gassing, may lead to asphyxiation, may waste fuel, and may have other undesirable consequences. A closed loop fuel transfer system may provide for safer, more effective, more efficient transfer of fluid, for example, liquid fuel, from a supply tank to a fuel canister to be refilled.

Figure 1B:
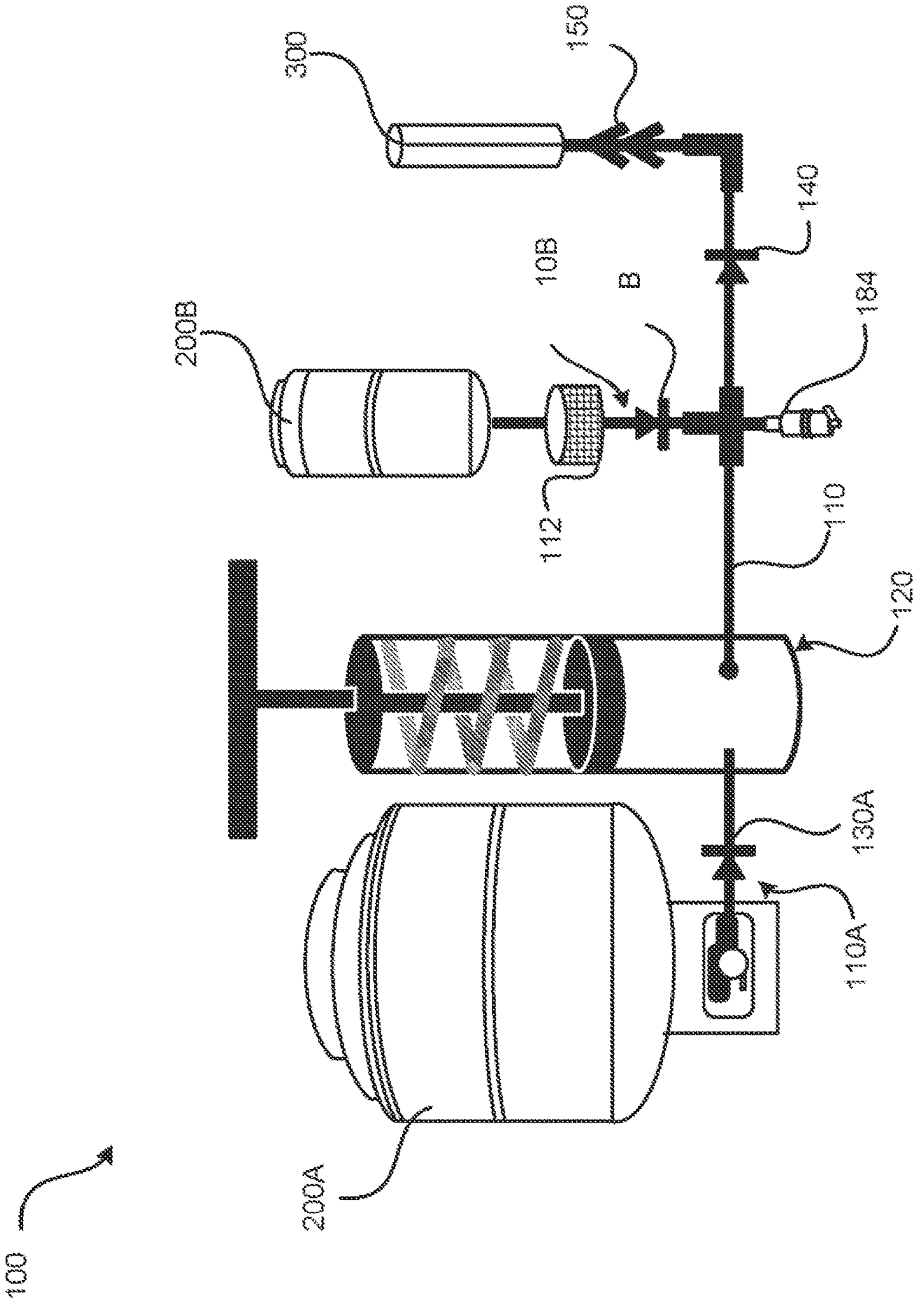

A schematic view of an example closed loop transfer station 100 is shown in FIGS. 1A-1B. A fluid flow line 110, such as, for example, a tube or pipe, may connect one or more supply tanks 200 and a fuel canister 300. The supply tank(s) 200 may contain fuel, for example, fuel in a fluid state such as, for example, liquid propane, for refilling of the fuel canister 300. A pump 120 may be connected to the fluid flow line 110. The pump 120 may be, for example, a piston type, air cylinder manual pump, as illustrated in the example shown in FIGS. 1A-1B, or other type of pumping mechanism that can generate a sufficient pressure gradient needed to push fuel into the fuel canister 300. As shown in the exemplary arrangement illustrated in FIG. 1A, a first check valve 130 may be positioned adjacent to a connection between the supply tank 200 and the fluid flow line 110, for example, between an outlet of the supply tank 200 and an inlet of the pump 120. The first check valve 130 may prevent unintended, or inadvertent, flow of fuel between the supply tank 200 and the fluid flow line 110. A second check valve 140 may be positioned adjacent to a connection between the fuel canister 300 and the fluid flow line 110, for example, between an outlet of the pump 120 and an inlet of the fuel canister 300, and also between the first check valve 130 and an inlet of the fuel canister 300. The second check valve 140 may prevent unintended, or inadvertent, flow of fuel between the fuel canister 300 and the fluid flow line 110. A quick disconnect coupler 150 may facilitate the connection of the fuel canister 300 to the line fluid flow 110, and the detachment of the fuel canister 300 from the fluid flow line 110. A pressure relief valve 184 may be coupled to the fluid flow line 110, to provide for pressure relief in the event of over-filling, or over pressurization in the fuel transfer station 100. In some implementations, one or more filter(s) 112 may be coupled to the fluid flow line 110. In the exemplary arrangement shown in FIG. 1A, the filter 112 is coupled at a portion of the fluid flow line 110 proximate the outlet of the supply tank 200.

As shown in the arrangement illustrated in FIG. 1B, in some implementations the closed loop fuel transfer station 100 may provide for connection of more than one supply tank 200 to the fluid flow line 110. In the example shown in FIG. 1B, the fuel transfer station 100 provides for connection of a first supply tank 200A and a second supply tank 200B to the fluid flow line 110. In this arrangement, backflow at a first inlet portion 110A of the fluid flow line 110 may be prevented by the check valve 130A, and backflow at a second inlet portion 110B of the fluid flow line 110 may be prevented by the check valve 130B. This arrangement may allow for only the first supply tank 200A to be connected to the fuel transfer station 100, to transfer fuel from the first supply tank 200A to the fuel canister 300, without backflow at the second inlet portion 110B. Similarly, this arrangement may allow for only the second supply tank 200B to be connected to the fuel transfer station 100, to transfer fuel from the second supply tank 200B to the fuel canister 300, without backflow at the first inlet portion 110A. In a situation in which both the first supply tank 200A and the second supply tank 200B are connected to the fuel transfer station 100, operation of the pump 120 in the manner described above may draw substantially equivalent amounts of fluid from the first supply tank 200A and the second supply tank 200B simultaneously. If one of the supply tanks 200A, 200B is emptied or disconnected (i.e., fluid flow from one of the supply tanks 200A, 200B is in some manner interrupted or discontinued) then operation of the pump 120 may draw fluid from the remaining supply tank 200A, 200B. Placement of the first and second supply tanks 200A, 200B at respective inlet sides of the check valves 130A, 130B, and placement of the fuel canister 300 at an outlet side of the check valve 140, ensure that fluid can only flow into a canister 300 connected to the fuel transfer station 100 at the outlet side of the check valve 140.

Figure 2A:
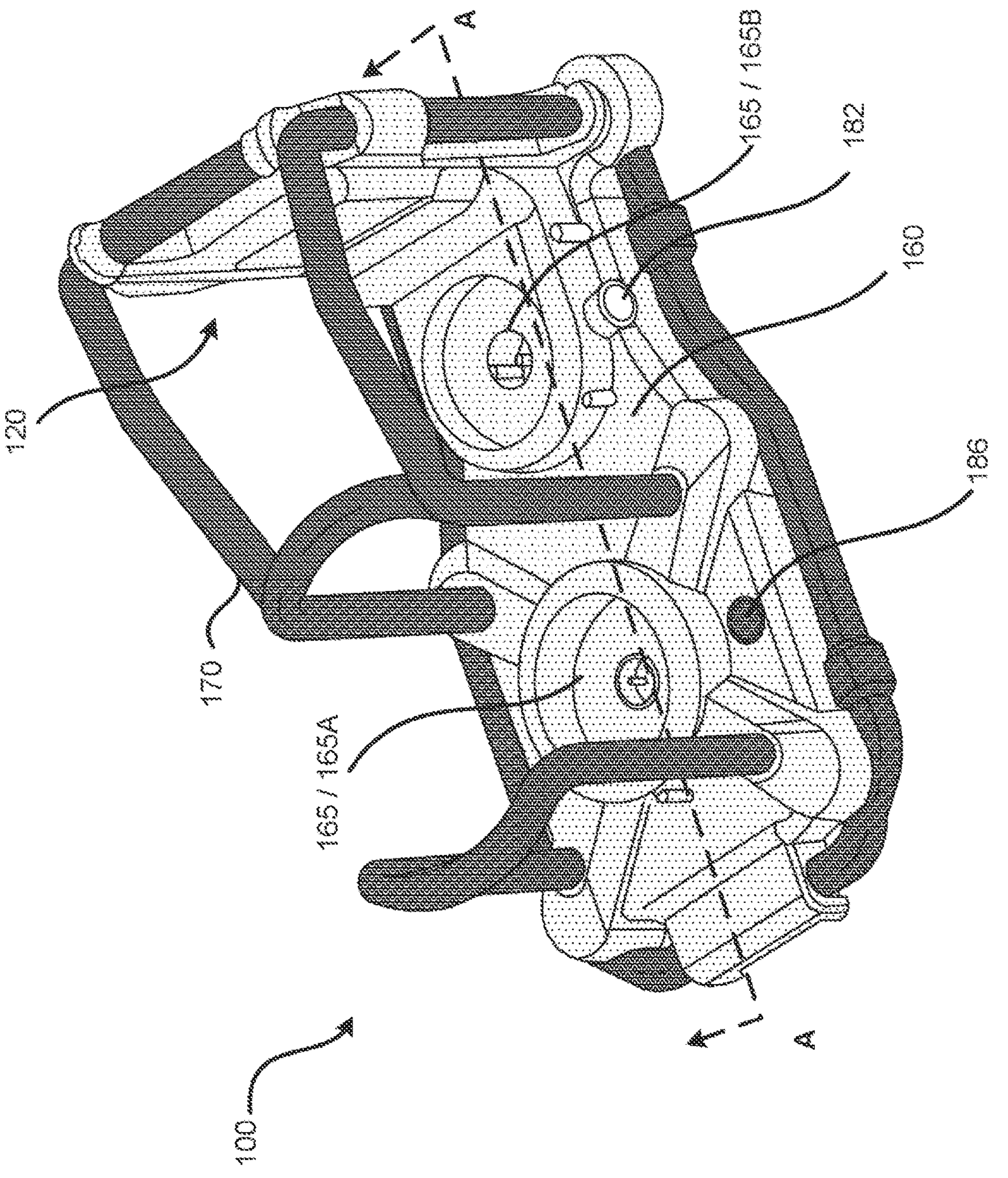
FIG. 2A is a top perspective view.
Figure 2B:
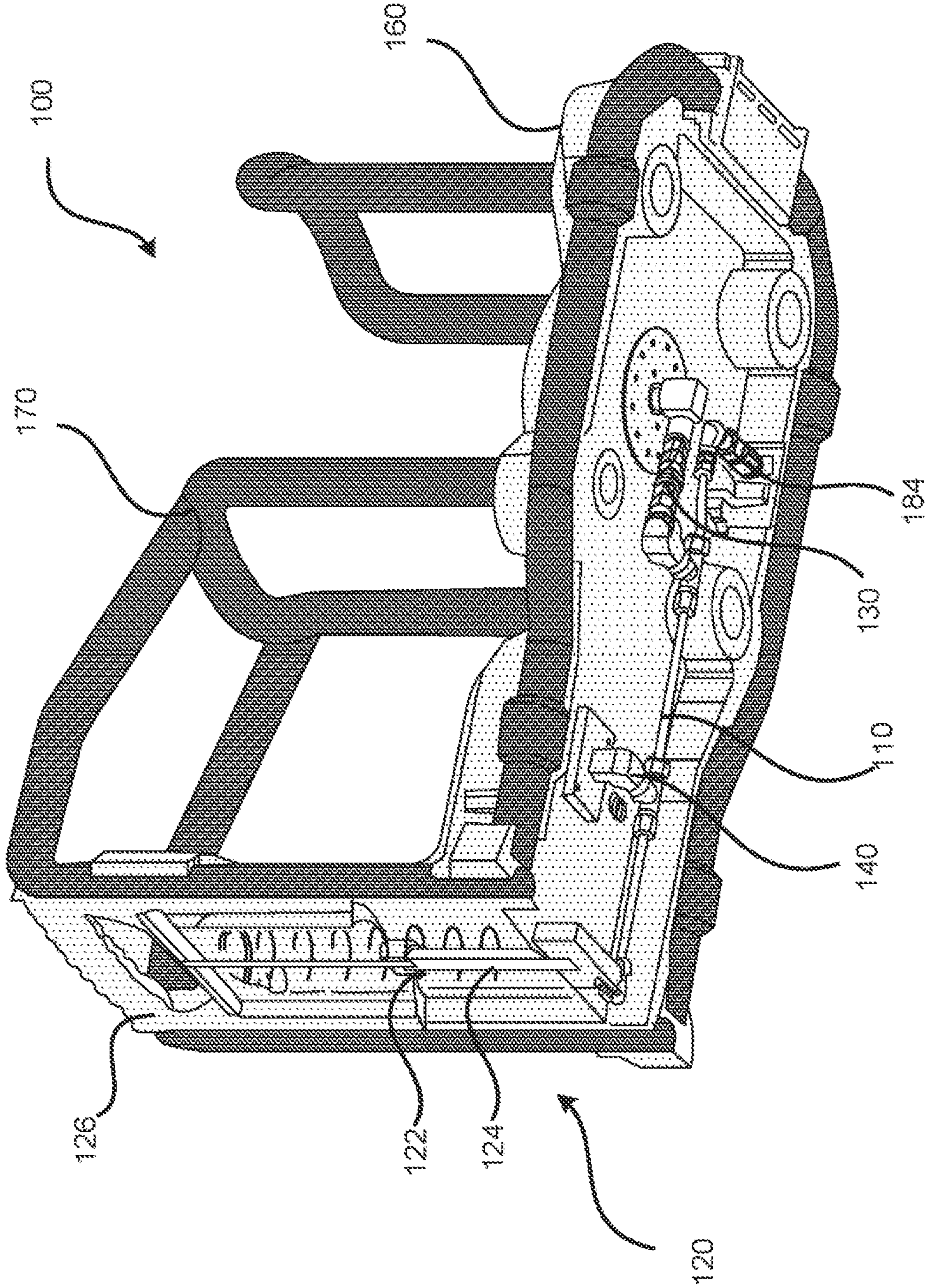
FIG. 2B is a bottom perspective view, of an example fuel transfer station, in accordance with implementations described herein.
Figure 2C:
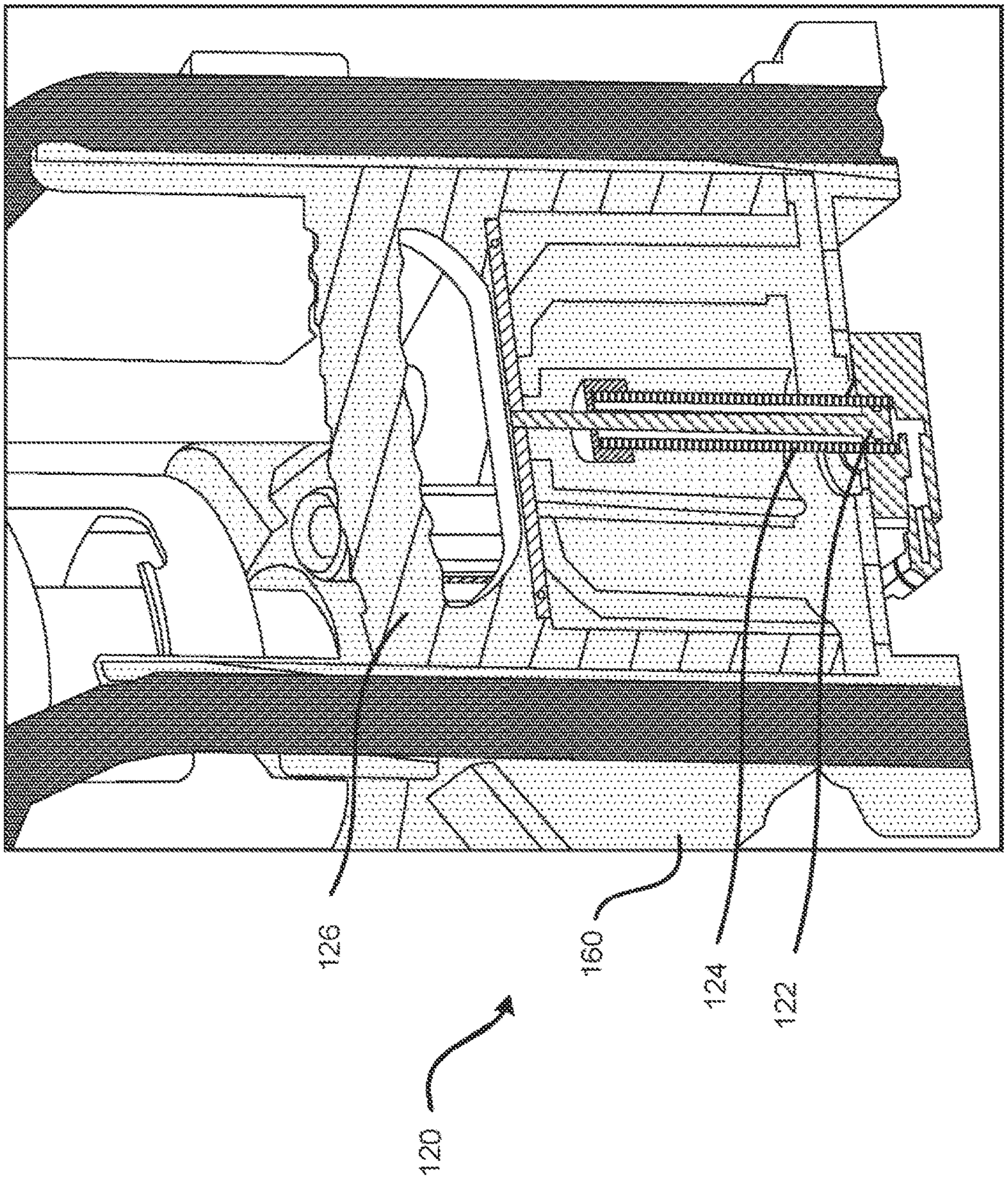
FIG. 2C is a cross sectional view of a pump portion of the example fuel transfer station shown in FIGS. 2A and 2B.
Figure 2D:
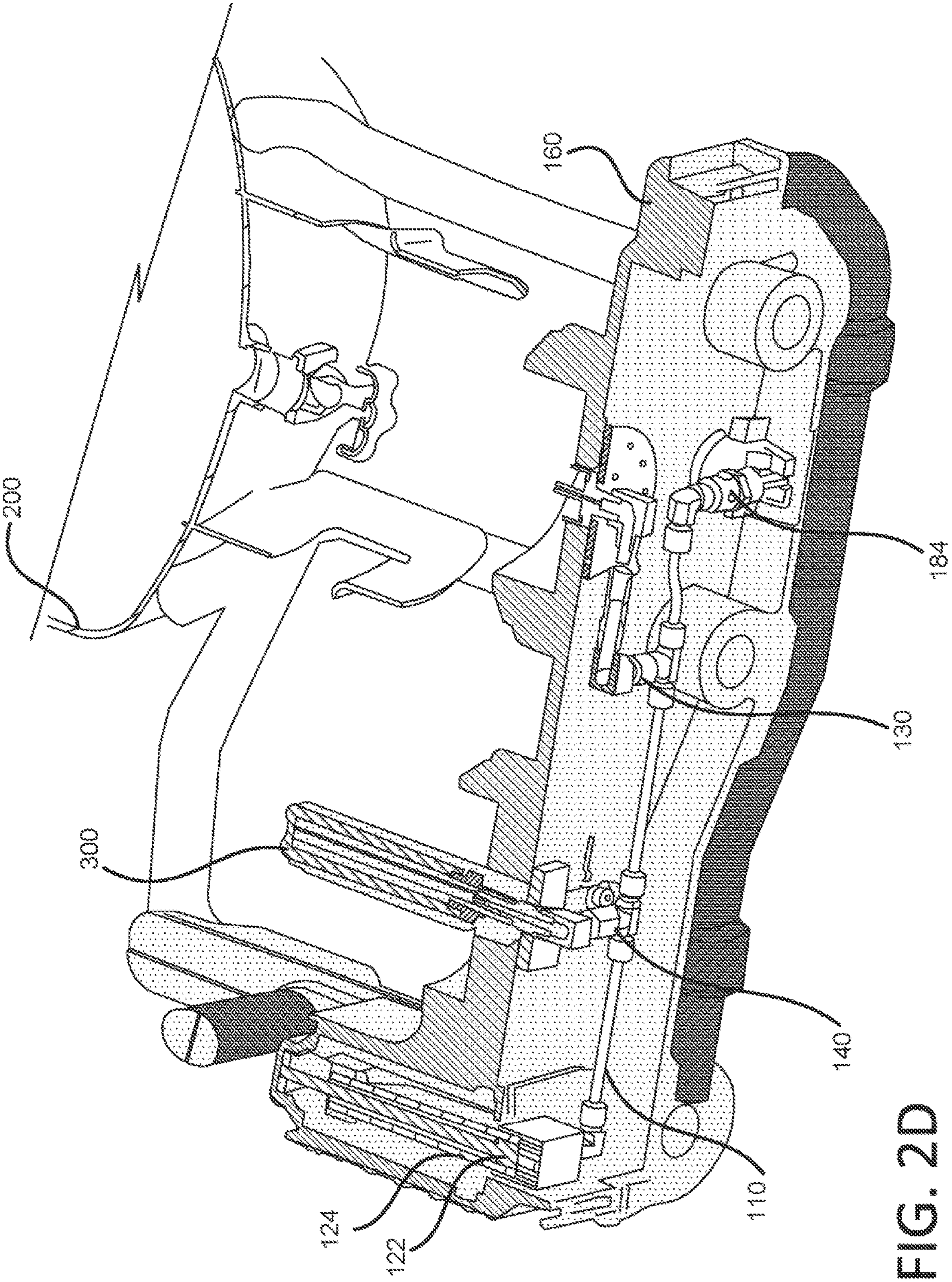
FIG. 2D is a cutaway view of the example fuel transfer station shown in FIGS. 2A and 2B, in accordance with implementations described herein.
Figure 2E:
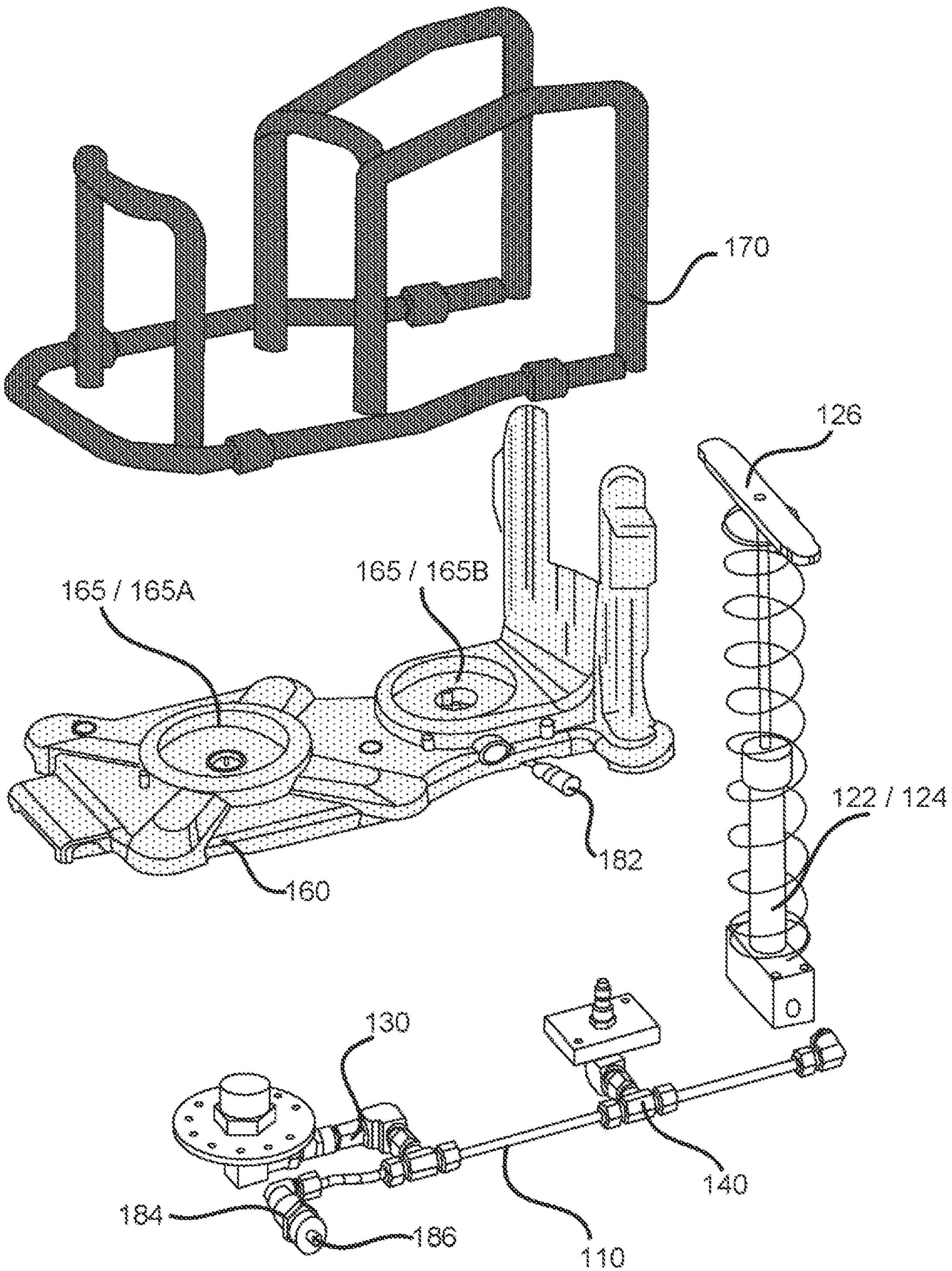
FIG. 2E is an exploded perspective view of the example fuel transfer station shown in FIGS. 2A and 2B, in accordance with implementations described herein.

FIG. 2A is a top perspective view of an example fuel transfer station, in accordance with implementations described herein. FIG. 2B is a bottom perspective view of the example fuel transfer station shown in FIG. 2A, with portions of a base housing and pump housing removed. FIG. 2C provides a cross sectional view of a pump installed in the base housing. FIG. 2D is a cross sectional view of the fuel transfer station, taken along line A-A of FIG. 2A. FIG. 2E is an exploded perspective view of the fuel transfer station. As shown in FIGS. 2A-2E, the fuel transfer station 100 may include a frame 170 coupled to a base 160. The frame 170 may provide a support structure for the supply tank 200 and the pump 120. Fluid flow line(s) 110 may be housed within the base 160 and/or coupled beneath the base 160. Connection ports 165 may be included in the base 160, and may be coupled to the fluid flow line 110. For example, a first connection port 165A may provide for connection of the supply tank 200 to the fuel flow line 110, and a second connection port 165B may provide for connection of the fuel canister 300 to the fuel flow line 110. As shown in more detail in FIGS. 2B-2E, the example pump 120 may include a piston 122 received in a cylinder 124, and coupled to a handle 126, with an interior of the cylinder 124 being in communication with the fluid flow lines 110. The example pump 120 may be actuated through manual manipulation of the handle 126, causing reciprocation of the piston 122 in the cylinder 124. Upward movement or expansion of the piston 122 in the cylinder 124 may decrease pressure in the flow lines 110 behind check valve 140 in connection with the pump 120 to draw fluid from the supply tank 200 into the cylinder 124 and into the flow lines 110. Conversely, downward movement or contraction of the piston 122 in the cylinder 124 may increase a pressure of fluid contained in the cylinder 124, and force the fluid from the cylinder 124 through the fluid flow lines 110 and into a fuel canister 300 removably connected to the second connection port 165B. The alternate opening and closing of the first check valve 130 and the second check valve 140 during cycling of the pump 120 may facilitate the transfer of fluid from the supply tank 200 to the fuel canister 300.

A pressure relief valve 184 (see FIG. 1B) may be actuated to provide for pressure relief in the event of over-filling, or over-pressurization. The pressure relief valve 184 may be set to a prescribed pressure, for instance, by selection of a spring constant to set a cracking pressure. During actuation of the pump 120, pressure may be increased in the transfer station 100 and in the fuel canister 300. Exposure of a pressure that is greater than or equal to the previously prescribed cracking pressure may cause the pressure relief valve 184 to open and/or vent to atmosphere. In some implementations, the pressure relief valve 184 may be manually actuated, for example, by depression of a pressure relief button 186 provided on the base 160 of the fuel transfer station 100. For example, in some implementations, the pressure relief valve 184 may be a spring loaded poppet valve, that is actuated, or opened, in response to an applied force, for example, an external force applied at the pressure relief button 186 and transferred to the pressure relief valve 184. Upon removal of the external force, the spring may bias the pressure relief valve 184 back to a closed state, to maintain pressure in the fluid flow lines 110.

The fluid flow line(s) 110 may be made of a rigid material, or a semi-rigid material, or a flexible material that is capable of maintaining structural integrity while conveying fluid under pressure, and that is capable of supporting connections with check valves and couplings with connectors to the supply tank 200 and the fuel canister 300, to be described in more detail below.

The example pump 120 shown in FIGS. 2A-2E employs a manual, piston or air cylinder type pumping mechanism, simply for ease of discussion and illustration. However, a fuel transfer station, in accordance with implementations described herein, may employ other types of pumping mechanisms, such as, for example, electro-mechanical pumps, pneumatic pumps, and the like, to generate a pressure gradient that causes fuel to flow between the supply tank 200 and the fuel canister 300. In some implementations, the pressure gradient to cause the fuel to flow between the supply tank 200 and the fuel canister 300 may be generated by a thermal device that, for example, applies heat to the supply tank 200 and/or applies cooling to the fuel canister 300.

Figure 2F:
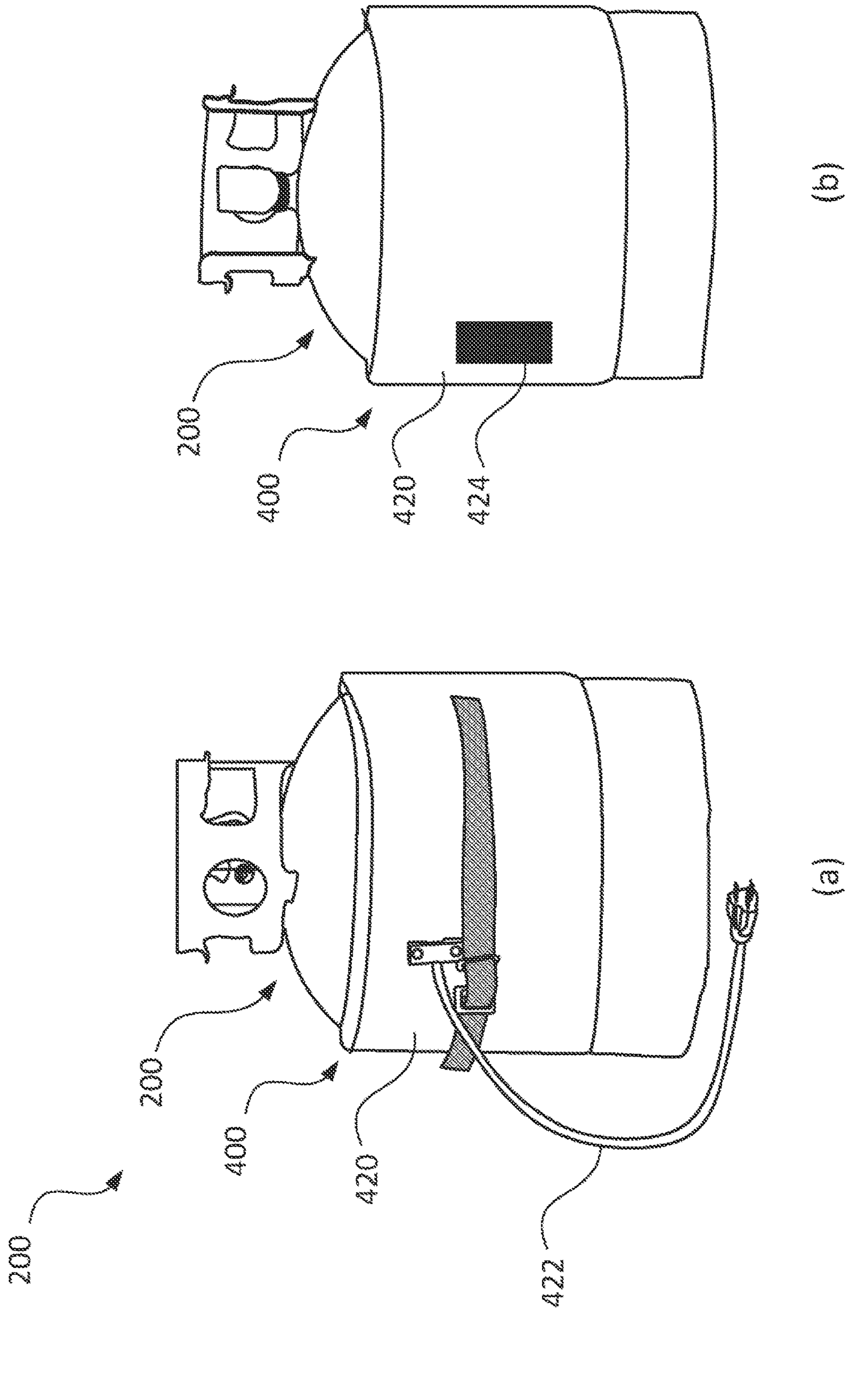
FIGS. 2F and 2G illustrate an example thermal device, in accordance with implementations described herein.

For example, as shown in FIG. 2F, in some implementations, a thermal device 400, in accordance with implementations described herein, may include a thermal jacket 420 that may be coupled to the supply tank 200. The thermal jacket 420 may be detachably coupled to an outer peripheral portion of the supply tank 200 by a fastening device such as, for example, hook and loop fasteners, clips, snaps, elastic fittings, and other such fastening devices. As shown in FIG. 2F(a), in some implementations, a power supply cord 422 may convey power from an external source of power to the thermal jacket 420. As shown in FIG. 2F(b), in some implementations, a power storage device 424 such as, for example, a battery, may supply power to the thermal jacket 420. The thermal jacket 420 may selectively apply heat to the supply tank 200, to increase the temperature of the supply tank 200 and generate a pressure gradient between the supply tank 200 and the fuel canister 300. The resulting pressure gradient may cause fuel to flow from the supply tank 200 to the fuel canister 300. In some implementations, the heat applied by the thermal jacket 420 to the supply tank 200 may cause the temperature of the supply tank 200 to increase by a relatively small amount, for example, just a few degrees warmer than the fuel canister 300. This relatively small increase in the temperature of the supply tank 200 may generate a temperature gradient sufficient to cause fuel to flow from the supply tank 200 to the fuel canister 300, and provide for relatively rapid filling of the fuel canister 300 without the need for a pump as described above.

Figure 2G:
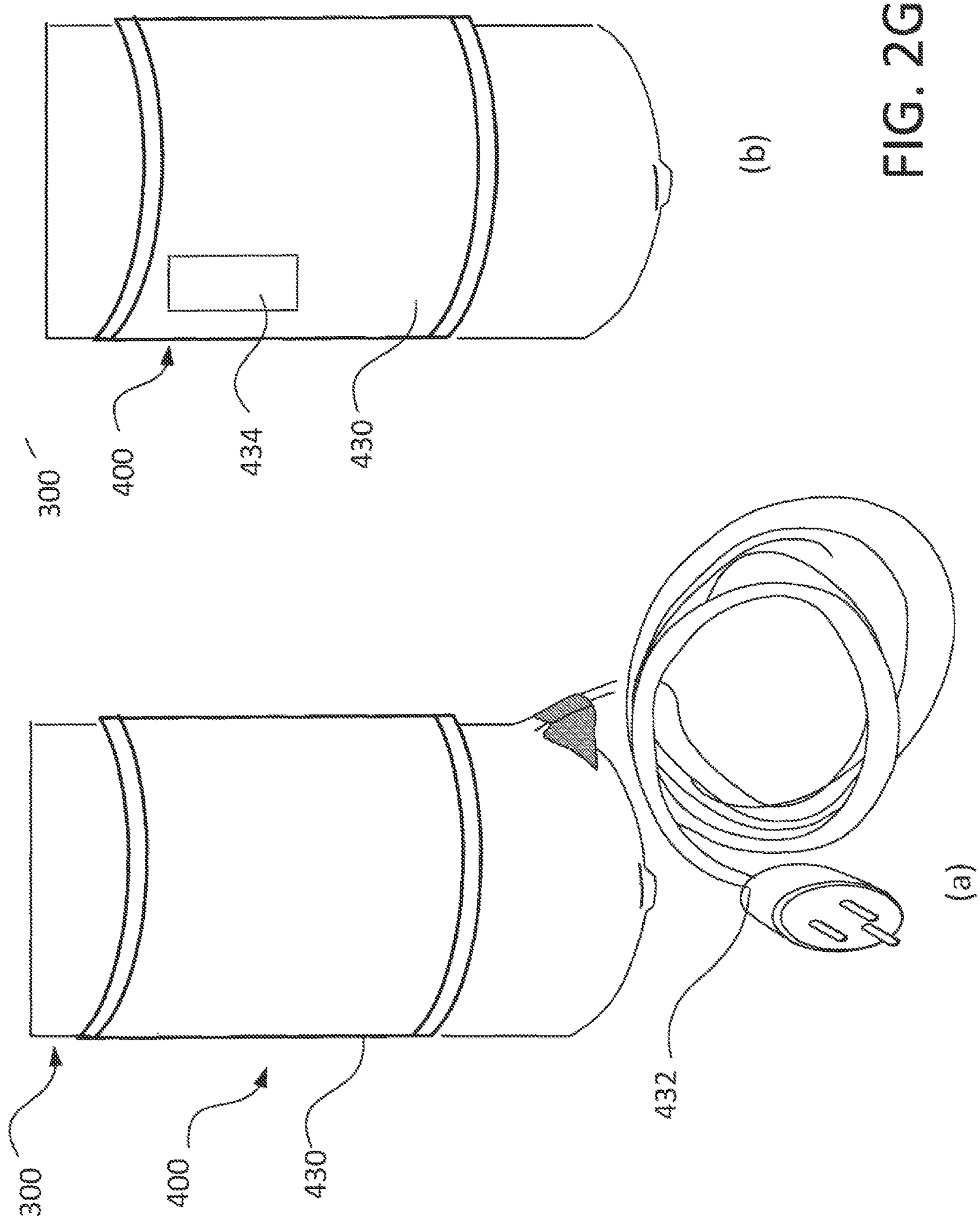

As shown in FIG. 2G, in some implementations, the thermal device 400 may include a thermal jacket 430 that may be coupled to the fuel canister 300. The thermal jacket 430 may be detachably coupled to an outer peripheral portion of the fuel canister 300 by a fastening device such as, for example, hook and loop fasteners, clips, snaps, elastic fittings, and other such fastening devices. As shown in FIG. 2G(a), in some implementations, a power supply cord 432 may convey power from an external source of power to the thermal jacket 430. As shown in FIG. 2G(b), in some implementations, a power storage device 434 such as, for example, a battery, may supply power to the thermal jacket 430. The thermal jacket 430 may selectively apply cooling to the fuel canister 300, to decrease the temperature of the fuel canister 300 and generate a pressure gradient between the supply tank 200 and the fuel canister 300. The resulting pressure gradient may cause fuel to flow from the supply tank 200 to the fuel canister 300. In some implementations, the cooling applied by the thermal jacket 430 to the fuel canister 300 may cause the temperature of the fuel canister 300 to decrease by a relatively small amount, for example, just a few degrees cooler than the supply tank 200. This relatively small decrease in the temperature of the fuel canister 300 may generate a temperature gradient sufficient to cause fuel to flow from the supply tank 200 to the fuel canister 300, and provide for relatively rapid filling of the fuel canister 300 without the need for a pump as described above.

Figure 3A:
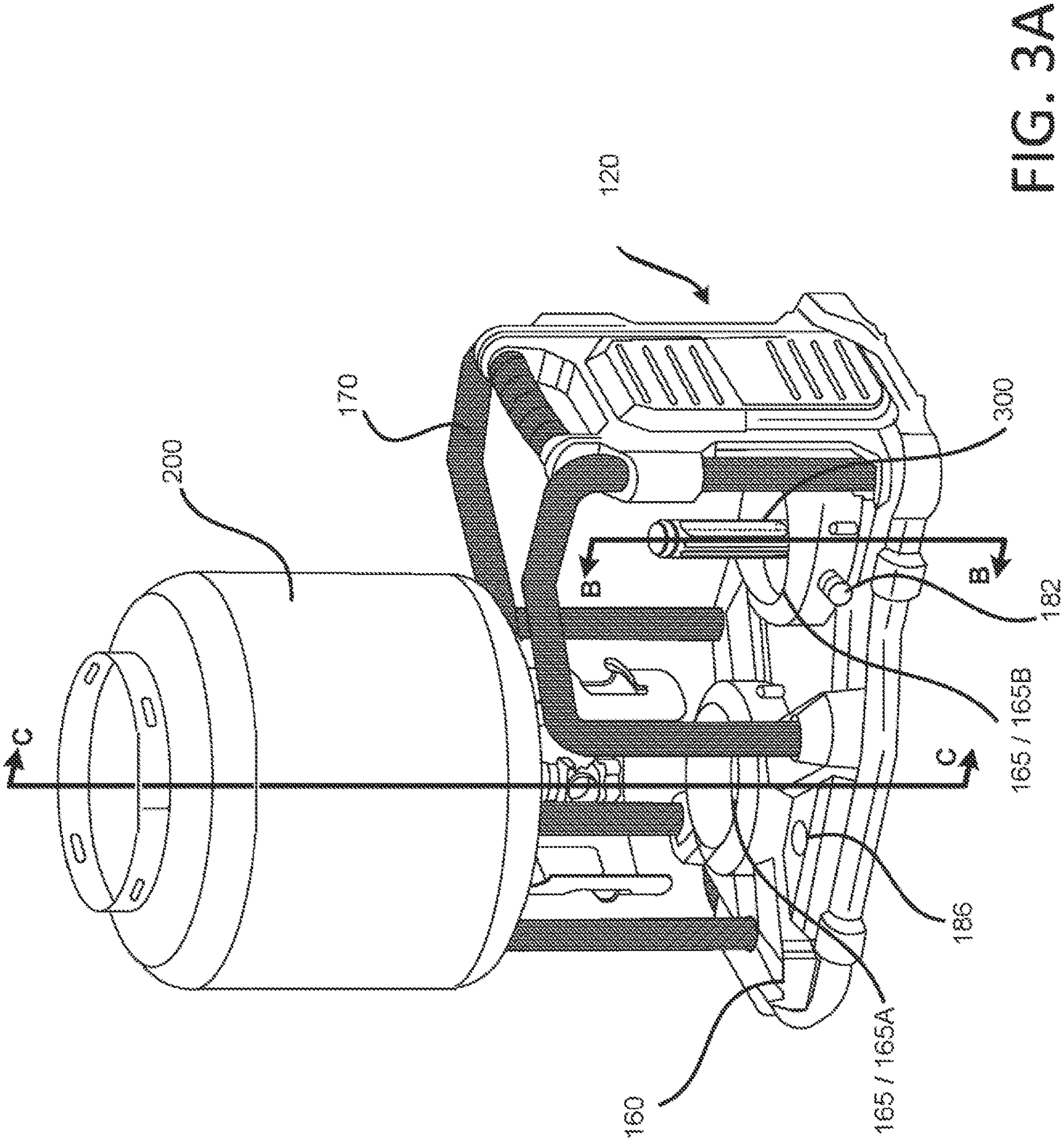
FIGS. 3A and 3B illustrate example refillable fuel canisters connectable to an example fuel transfer station, in accordance with implementations described herein.
Figure 3B:
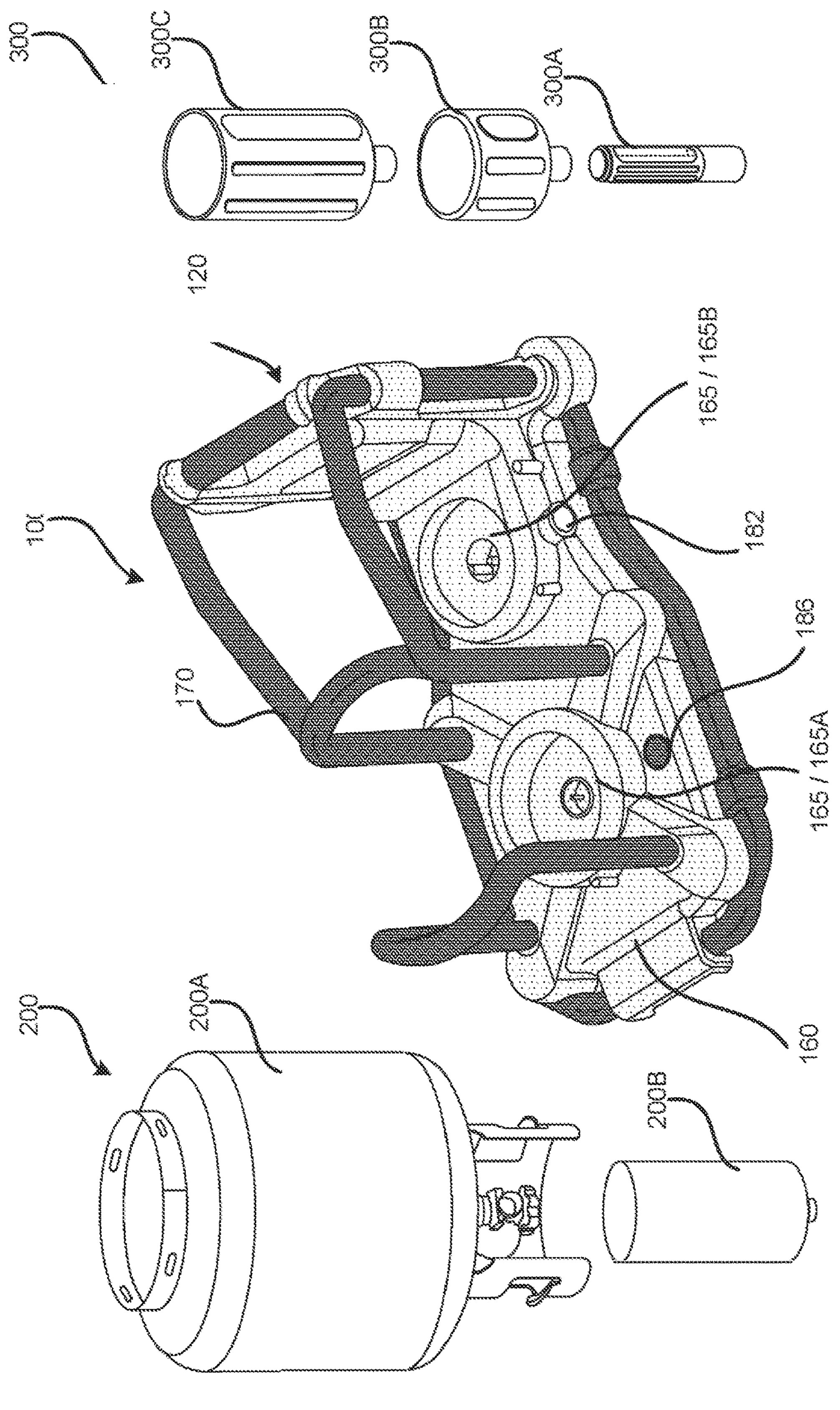

FIG. 3A illustrates the example fuel transfer station 100 with a supply tank 200 positioned for connection to the first connector 165A, and a fuel canister 300 connected to the second connector 165B. The supply tank 200 may also be oriented in a substantially inverted position so as to induce fluid flow from an outlet of the fuel tank 200 into the first connector 165A. In the example shown in FIG. 3A, the supply tank 200 has a relatively large capacity compared to that of the fuel canister 300. For example, in the example arrangement shown in FIG. 3A, the supply tank 200 may have a bulk fuel capacity of approximately 20 pounds of liquid fuel (for example, propane), whereas the fuel canister 300 may be sized for use in a handheld tool. FIG. 3B illustrates that the fuel transfer station 100 may accommodate supply tanks 200A and 200B, having a variety of different fuel capacities, based on, for example, storage constraints, fuel requirements for a particular job site, and the like. Similarly, the fuel transfer station 100 may accommodate fuel canisters 300A, 300B and 300C for refilling that have a plurality of different fuel capacities based on, for example, the types of equipment in use, storage constraints and other such factors. Hereinafter, refilling of an exemplary fuel canister 300 such as the fuel canister 300A shown in FIG. 3A, which is sized for use with a piece of handheld equipment, such as a cordless combustion powered hand tool, will be described, simply for ease of discussion and illustration.

Figures 4A, 4B, 4C, 4D:
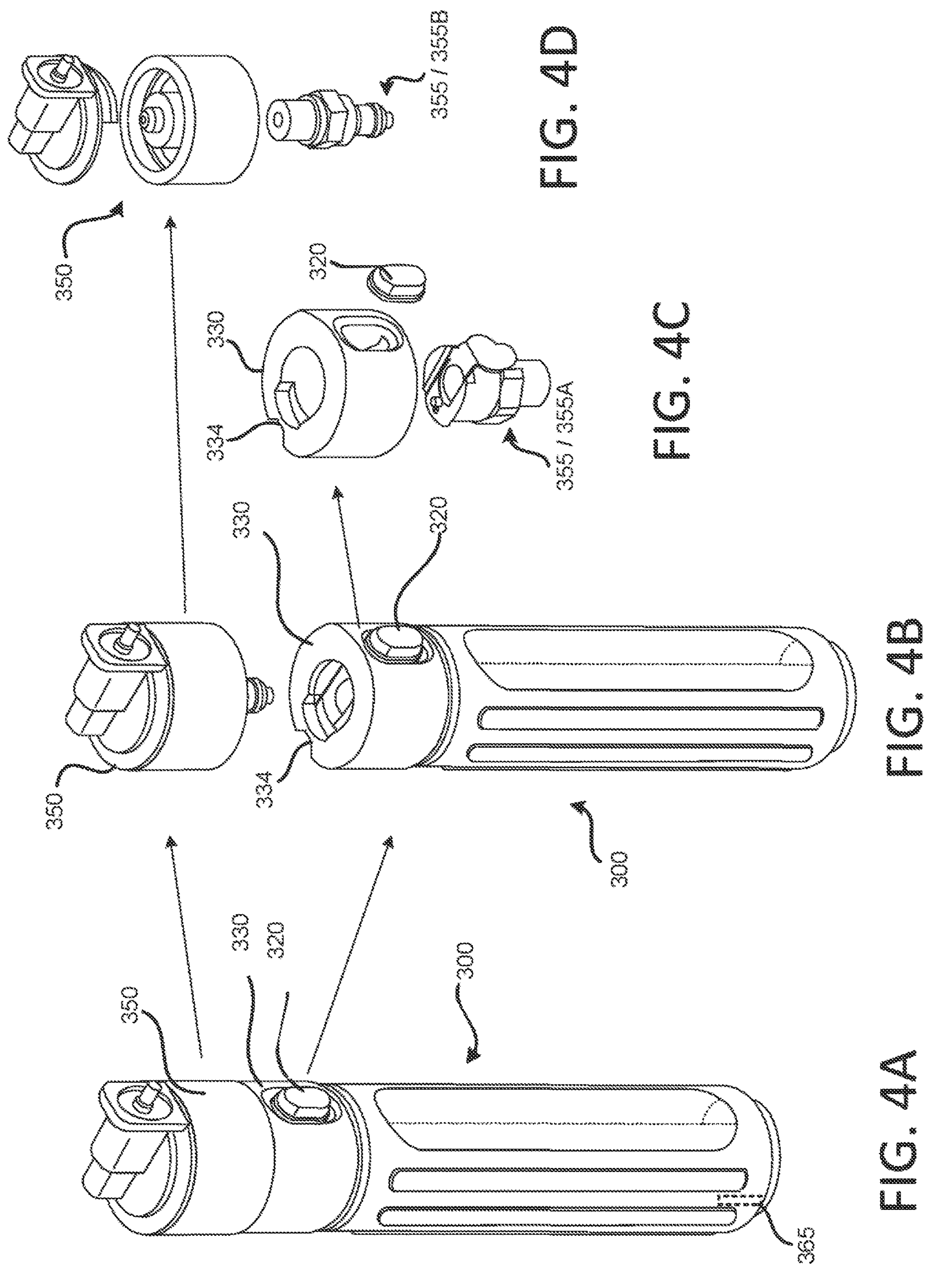
FIGS. 4A-4D illustrate components of an example refillable fuel canister, in accordance with implementations described herein.

FIGS. 4A-4D illustrate an exemplary fuel canister assembly that may be connected to the fuel transfer station 100 for refilling. A cap portion 330 may be positioned at a top end portion of the fuel canister 300. An adapter 350 may be removably coupled to the cap portion 330, as shown in FIG. 4B. The cap portion 330 of the canister 300 may be adapted to allow for connection of a plurality of different types of adapters 350 to the fuel canister 300, depending on, for example, the tool and/or piece of equipment to which the fuel canister 300 is to deliver fuel. In some implementations, a fuel metering valve which provides a previously defined amount, or volume, of fuel, may be housed within the cap portion 330 of the canister 300. In some implementations, a free flow of fuel may pass through the cap portion 330 of the fuel canister 300. In some implementations, a release mechanism provided on the cap portion 330 may be manipulated or actuated to release the adapter 350 from the cap portion 330 of the fuel canister 300, as shown in FIG. 4C. In some implementations, a quick disconnect coupler 355 including a body portion 355A (in one of the cap portion 330 or the adapter 350) and a stem portion 355B (in the other of the cap portion 330 or the adapter) may provide for the quick coupling of the adapter 350 to the cap portion 330 of the fuel canister 300, and the quick decoupling of the adapter 350 from the cap portion 330 of the fuel canister 300. A plurality of different cap portions 330 and/or different adapters 350 may interface with various different pieces of equipment to deliver fuel to the combustion powered equipment. A similar arrangement of a quick disconnect coupler 355 including a body portion 355A (in one of the fuel canister 300 or the connection port 165B) and a stem portion 335B (in the other of the fuel canister 300 or the connection port 165B) may be used to releasably couple the fuel canister 300 to the fuel transfer station 100.

In some implementations, the connection between the adapter 350 and the cap portion 330 of the fuel canister 300, and the connection between the fuel canister 300 and the connection port 165B of the fuel transfer station 100, may be specifically keyed, or patterned, so that only designated adapters 350 may be connected to the fuel canister 300, and only designated fuel canisters 300 may be coupled to the fuel transfer station 100, by inserting the stem portion 355B into the body portion 355A of the quick disconnect coupler 355, for example in the correct orientation and/or in the correct sequence of movements. For example, when connecting the fuel canister 300 to the fuel transfer station 100 for filling (as shown in FIG. 3A), the connection between the cap portion 330 of the fuel canister 300 and the connection port 165B may be specifically keyed, or patterned, so that only designated fuel canisters 300 may be connected to the fuel transfer station 100 by inserting the stem portion 355B into the body portion 355A of the quick disconnect coupler 355, for example in the correct orientation and/or in the correct sequence of movements. In some implementations, the keying, or patterning, between the body portion 355A and the stem portion 355B of the quick disconnect coupler 355 may include a unique geometry, a unique interface including geometric alignment such as insertion of spaced prongs into a corresponding cavity, and the like. In some implementations, engagement between the body portion 355A and the stem portion 355B of the quick disconnect coupler 355 may rely on the insertion of the stem portion 355B into the body portion 355A, followed by a movement, such as a relative rotation of the stem portion 355B and the body portion 355A, for full engagement. Keyed engagement in this manner may, in turn, allow for a secure connection during the flow of fluid, such as, for example, fuel in a pressurized state, into the fuel canister 300 in a filling operation, and out of the fuel canister 300 in a dispensing operation.

Figure 5:
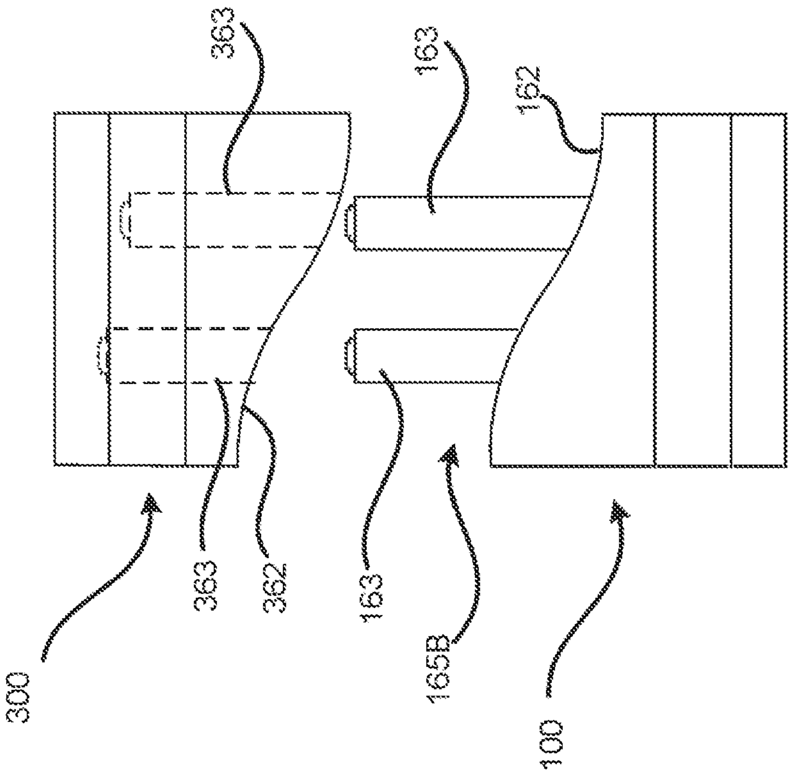
FIG. 5 illustrates an example connection interface of an example refillable fuel canister, in accordance with implementations described herein.

FIG. 5 illustrates an example interface between the fuel canister 300 and the fuel transfer station 100, for example, between the fuel canister 300 and the connection port 165B of the fuel transfer station 100. The fuel canister 300 may be aligned with the connection port 165B of the fuel transfer station 100, for example in an inverted position with respect to the fuel transfer station 100, as shown in FIG. 3A. In the example interface shown in FIG. 5, the keying features to ensure proper connection of an appropriate fuel canister 300 to the fuel transfer station 100 may include the alignment of pins 163 (in one of the connection port 165B or the fuel canister 300) with corresponding recesses 363 (in the other of the connection port 165B or the fuel canister 300). This alignment may also include alignment of a geometry, or surface contour 162 of the connection port 165B with a corresponding geometry, or surface contour 362, of the fuel canister 300. In the example shown in FIG. 5, the keyed interface includes two pins 163, and two corresponding recesses 363, simply for ease of discussion and illustration. However, more, or fewer, pins 163 and corresponding recesses 363 may be included in the keyed interface. Further, in the example shown in FIG. 5, the two pins 163 are provided in the connection port 165B, and the two corresponding recesses 363 are formed in the fuel canister 300, simply for ease of discussion and illustration. However, the pins may be provided on the fuel canister 300, and the corresponding recesses 363 may be formed in the connection port 165B, and/or some of the pins 163 may be provided on the fuel canister 300 and some of the pins 163 in the connection port 165B, with corresponding recesses formed in the connection port 165B and the fuel canister 300.

In some implementations, the keying of the interface may include, for example, a contouring of an outer peripheral portion of the fuel canister 300, for example, a contouring of an outer peripheral portion of the cap portion 330 of the fuel canister 300, mated with a complementary contouring of an inner peripheral portion of the connection port 165B. For example, in some implementations, the cap portion 330 of the fuel canister 300 may include a contoured portion 334 (see, for example, FIGS. 4B and 4C), for example, at an outer peripheral portion of the cap portion 330. The connection port 165B may include a contoured portion 164 (see, for example, FIG. 7A), for example, at an inner peripheral portion of the connection port 165B. A shape, or contour, of the contoured portion 164 of the connection port 165B may correspond to, or be complementary to, the contoured portion 334 of the fuel canister 300, so that the contoured portion 334 of the fuel canister 300 and the contoured portion 164 of the connection port 165 may be engaged when the fuel canister 300 is coupled in the connection port 165 (see, for example, FIG. 7B). This complementary contouring of the outer peripheral portion of the fuel canister 300 and the inner peripheral portion of the connection port 165B may help to ensure that only appropriate fuel canisters 300 are coupled to the fuel transfer station 100 for refilling, and may provide for proper alignment of the fuel canister 300 in the connection port 165B.

In some implementations, or in addition to keyed interface described previously, the quick disconnect coupler 355 may have unique geometry for mating the body portion 355A with the stem portion 355B. Furthermore, other variations separate from or in addition to the examples described above may also be considered.

Figure 6C:
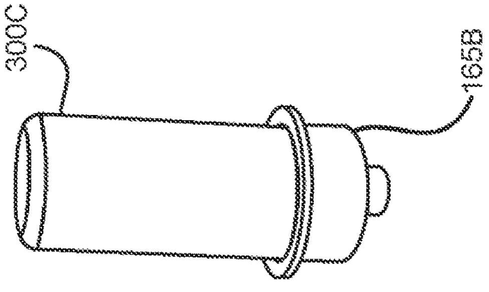
FIGS. 6A-6E illustrate connection of an example refillable fuel canister in a connection port of an example fuel transfer station, in accordance with implementations described herein.
Figure 6E:
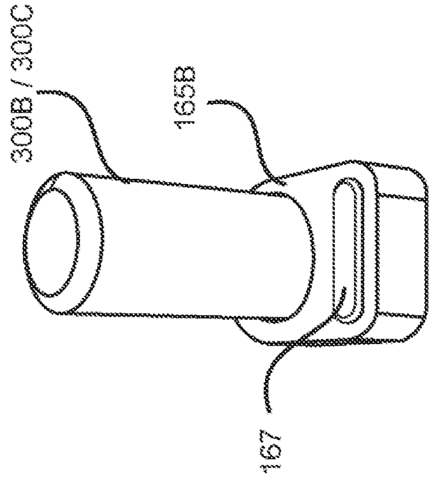
Figure 6B:
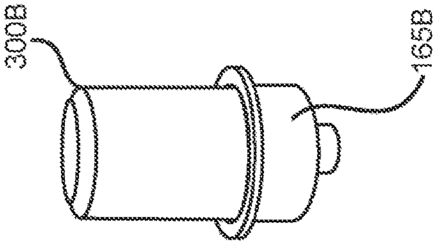

As described above, fuel canisters 300 having various different sizes and/or capacities, such as, for example, the exemplary fuel canisters 300A, 300B and 300C shown in FIG. 3A, may be connected to the fuel transfer station 100 for refilling. In particular, FIGS. 6A-6E illustrate the exemplary fuel canisters 300A, 300B and 300C, having different sizes and/or capacities, coupled to a common connection port 165B or interface at the outlet of the fuel transfer station 100. In FIG. 6A, the smallest fuel canister 300A, is coupled in the connection port 165B, and is secured in the connection port 165B through mechanical engagement of the valve structure extending between the connection port 165B and the fuel canister 300A, including, for example, the keyed interface described in detail with respect to FIG. 5. In some implementations such as those with a quick disconnect coupler 355, shut-off features may be integrated into valve mechanisms of the stem portion 355B and/or the body portion 355A. The shut-off features may be spring loaded, and may allow fluid flow when the stem portion 355B is engaged with body portion 355A, and may shut-off the fluid flow path upon disengagement of, or a break in connection between the body portion 355A and the stem portion 355B of the coupler 355.

Figure 6D:
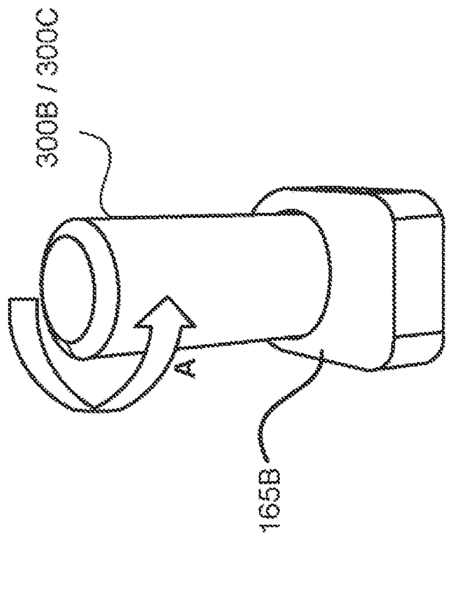
Figure 6A:
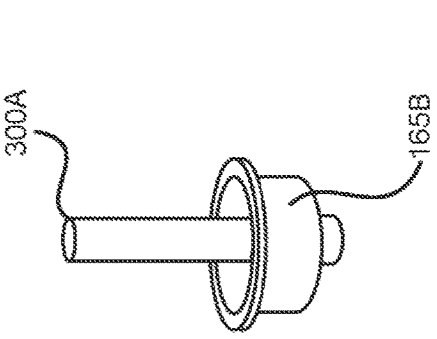

As shown in FIG. 6D, in some implementations, the fuel canister(s) 300B/300C may be inserted in to the connection port 165B of the fuel transfer station 100, and then turned, or twisted, for example in the direction of the arrow A, to complete the connection or engagement between the fuel canister 300B/300C and the connection port 165B. In this arrangement, the fuel canister 300B/300C may be disengaged from the connection port 165B by turning or twisting the fuel canister 300B/300C in the direction opposite the arrow A. As shown in FIG. 6E, in some implementations, the fuel canister(s) 300B/300C may be snapped into the connection port 165B of the fuel transfer station 100 to complete the connection or engagement between the fuel canister 300B/300C and the connection port 165B. In this arrangement, the fuel canister 300B/300C may be disengaged from the connection port 165B by, for example, manipulating a release button 167 on the base 160 of the fuel transfer station 100.

Figure 7B:
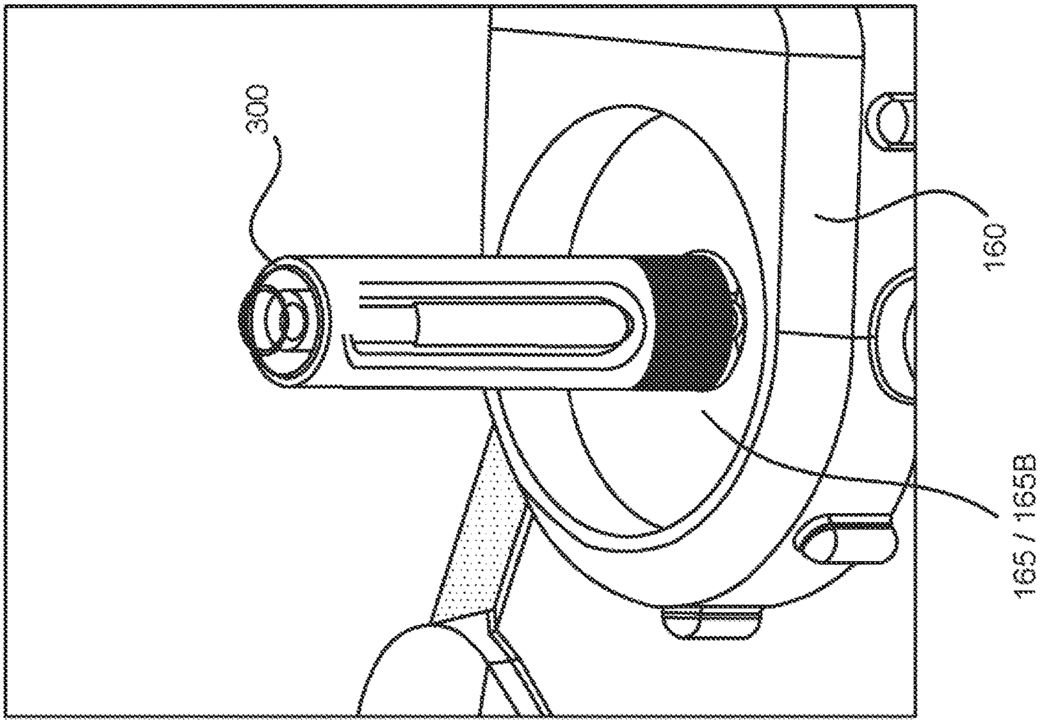
FIGS. 7A-7C illustrate connection of an example refillable fuel canister in a connection port of an example fuel transfer station.
Figure 7A:
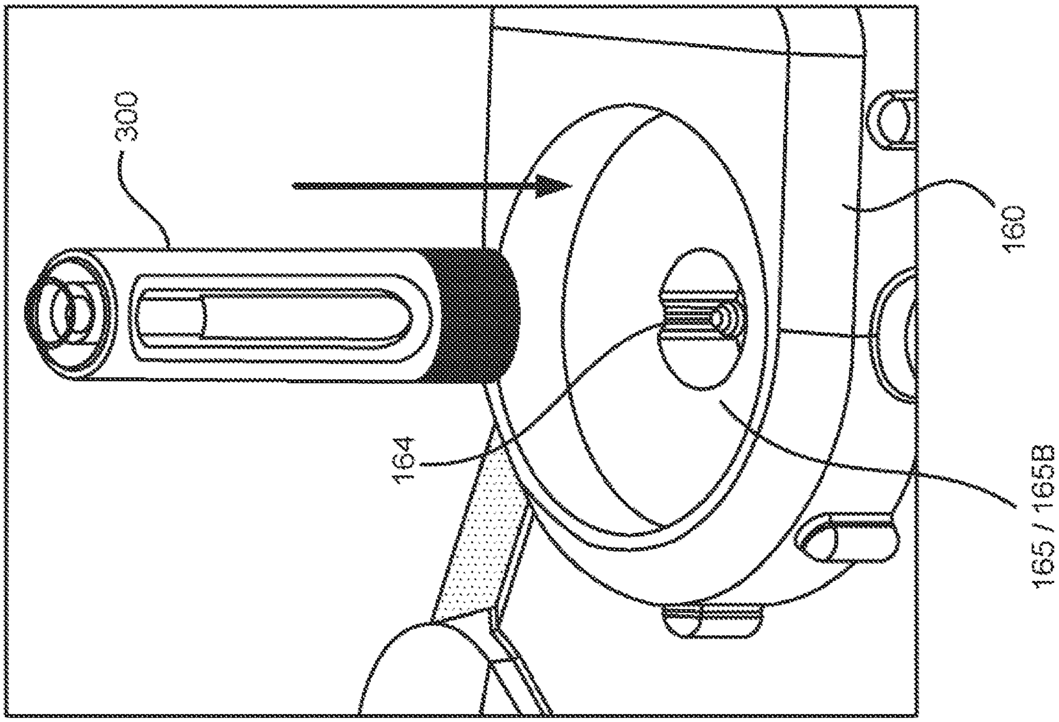
Figure 7C:
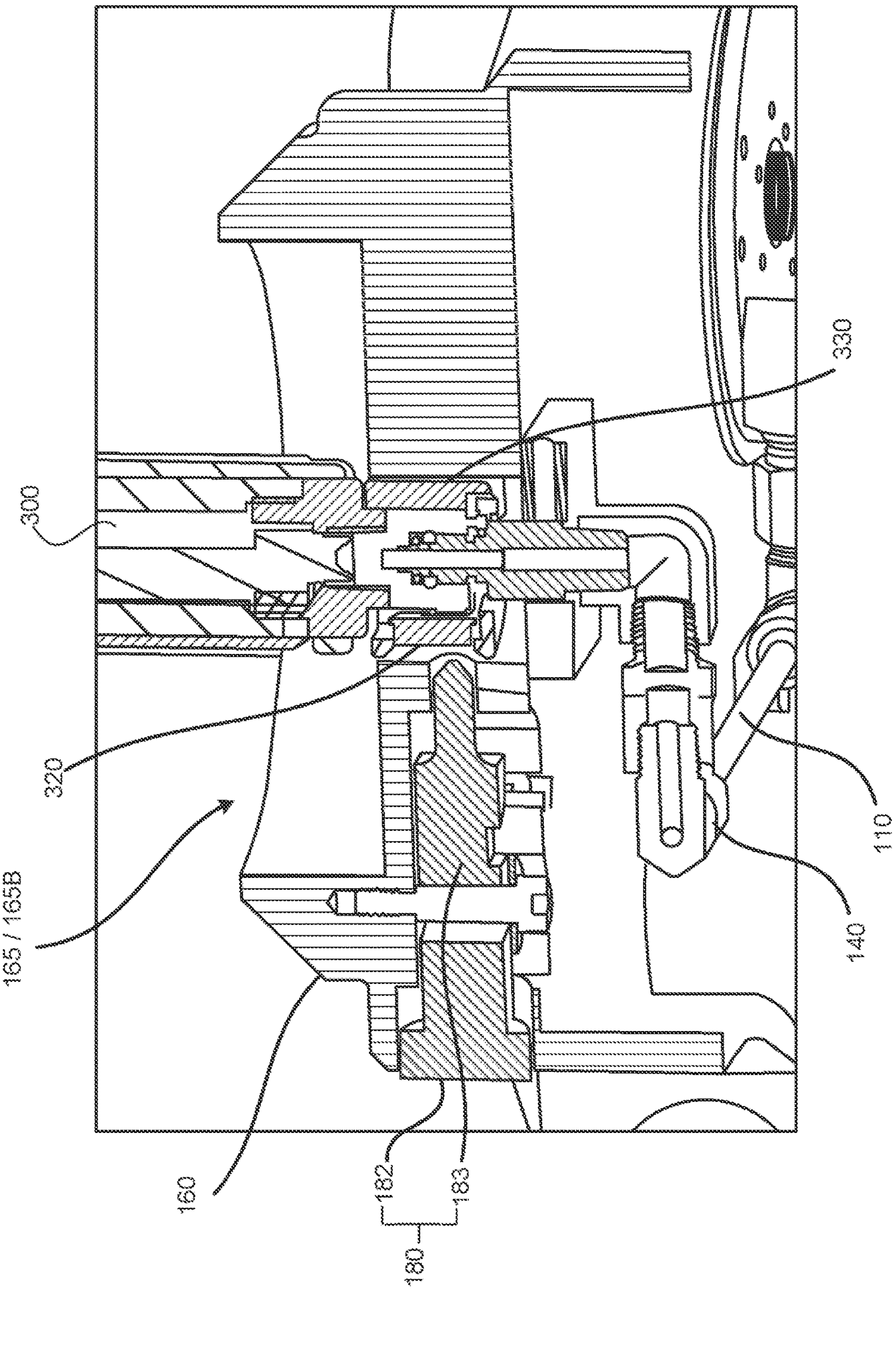
Figure 7D:
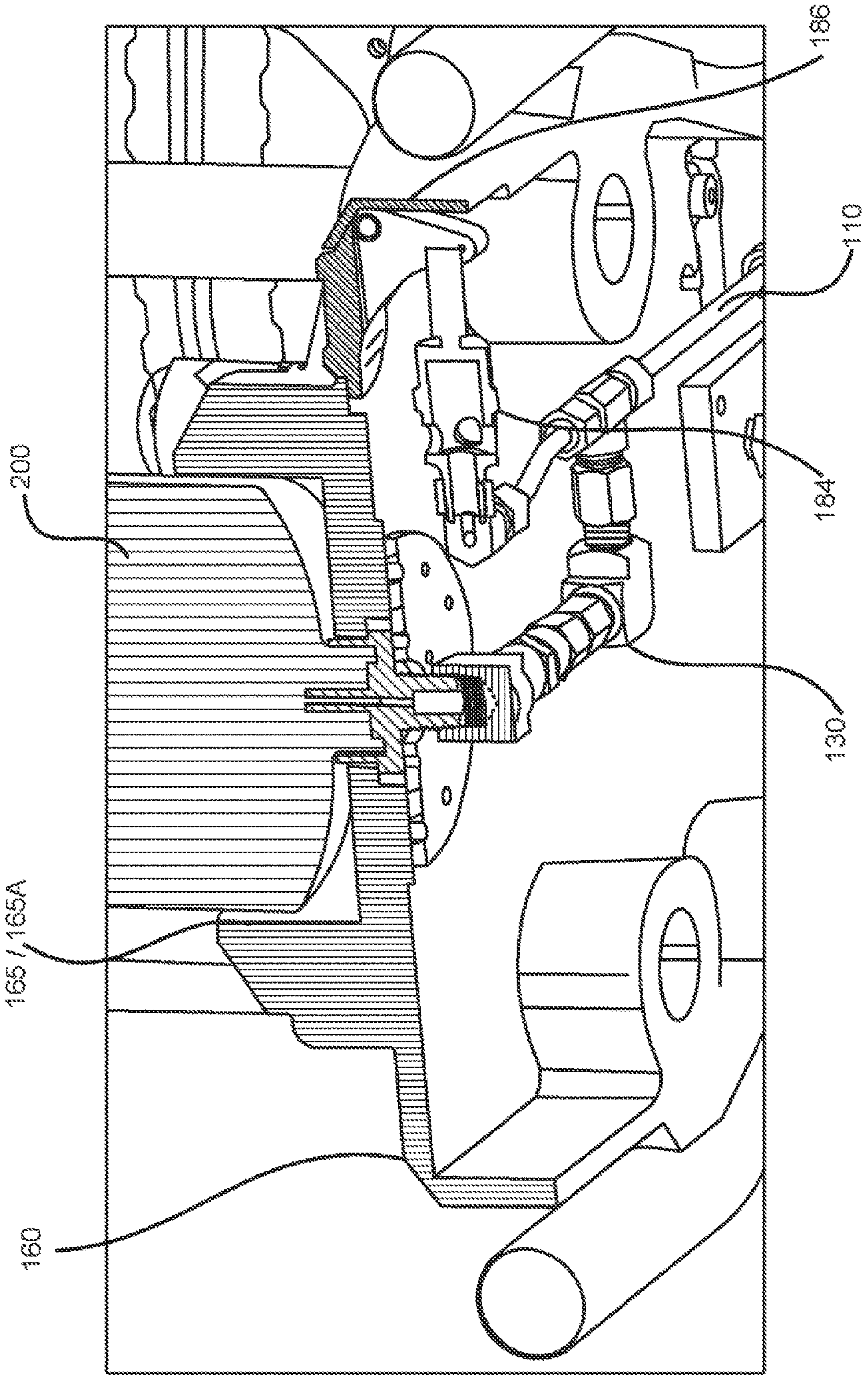
FIG. 7D illustrates connection of an example supply tank in a connection port of an example fuel transfer station, in accordance with implementations described herein.

FIGS. 7A and 7B illustrate the connection of the fuel canister 300 into the connection port 165B of the fuel transfer station 100, and FIG. 7C is a cross sectional view taken along line B-B of FIG. 3A, illustrating a connected state of the fuel canister 300 to the fuel transfer station 100. FIG. 7D is a cross sectional view taken along line C-C of FIG. 3A, illustrating a connected state of the supply tank 200 to the fuel transfer station 100. Once the fuel canister 300 to be filled is securely connected to the fuel transfer station 100, fuel may be transferred from the supply tank 200 to the fuel canister 300. As described above, the pump 120 may be actuated to generate a pressure gradient, or pressure differential, between the supply tank 200 and the fuel canister 300, that pushes, or urges, or guides fluid, for example, liquid fuel such as propane, from the supply tank 200 to the fuel canister 300. In response to the connection of the supply tank 200 and the connection of the fuel canister 300 to the fuel transfer station, and the pressure gradient generated by the pumping action of the pump 120, the first check valve 130 may be opened to allow flow from the supply tank 200, through the first check valve 130 into the fluid supply line 100 toward the fuel canister 300. The pressure gradient may continue to urge the flow of liquid fuel in the direction of the fuel canister 300, through the second check valve 140, and into the fuel canister 300. The pressure gradient may be maintained, for example, through sustained pumping if necessary, and fuel may continue to flow into the fuel canister 300 in this manner until the fuel canister 300 is full, and/or until the fuel canister 300 has reached a desired fill level.

Figure 8C:
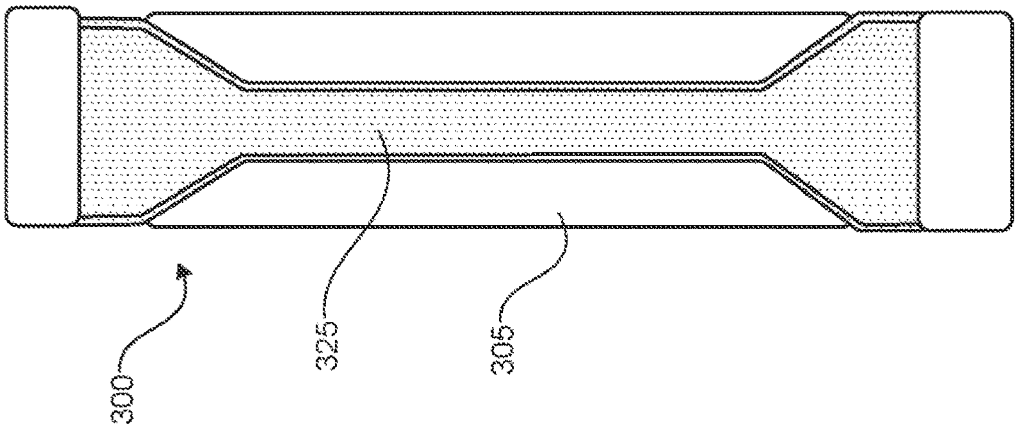
FIGS. 8A-8C illustrate example refillable fuel canisters having transparent outer wall portions, in accordance with implementations described herein.
Figure 8B:
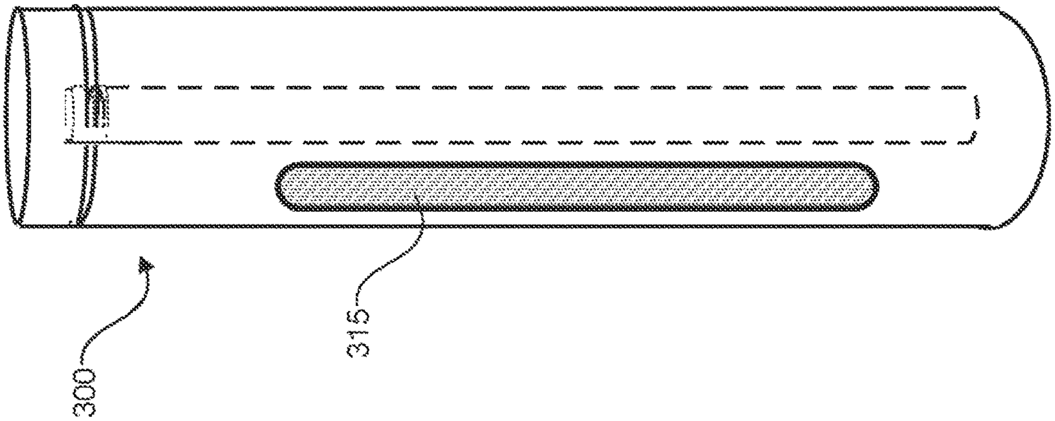
Figure 8A:

In some implementations, the desired fill level may be visually detected through a clear portion (for example, transparent or translucent) of the outer wall 305 of the fuel canister 300 (see, for example, FIGS. 8A-8C). In some implementations, the fill level of the fuel canister 300 may be measured by a pressure gauge and/or assessment of force applied to the handle 126 of the pump 120. To avoid over-filling, or over-pressurization, the pressure relief valve 184 may have a prescribed cracking or opening pressure that causes the pressure relief valve 184 to be actuated, or opened, to relieve pressure in the fluid flow lines 110. In the event that the fuel canister 300 approaches an over-filled or over-pressurized state, the fuel canister 300 may include a pressure relief valve 365, or vent 365 (see, for example, FIGS. 4A-4B), having a prescribed cracking or opening pressure.

In some implementations, a release mechanism 180 may be actuated to release the engagement between the fuel canister 300 and the connection port 165B of the fuel transfer station 100. The release mechanism 180 may be installed in the base 160 of the fuel transfer station 100. The release mechanism 180 may include a release button 182 accessible from an exterior of the fuel transfer station 100. The release button 182 may be coupled to, or extend into, a release arm 183. In response to depression of the release button 182, a distal end portion of the release arm 183 may contact, and exert a corresponding force on a release pad 320 of the cap portion 330 of the fuel canister 300. The force exerted on the release pad 320 of the cap portion 330 of the fuel canister 300 may release engagement of the fuel canister 300 in the connection port 165B, allowing for disengagement of the fuel canister 300 from the fuel transfer station 100. When the release pad 320 of the cap portion 330 of the fuel canister 300 is pushed, a sliding lock of the quick disconnect coupler 355 that attaches the body portion 355A with the stem portion 355B, may allow for separation and disengagement. Other quick disconnect mechanisms or attach/detach mechanisms may also be utilized that include locking shafts, collars, spring loaded detents, and the like for release of coupled connectors.

As shown in FIGS. 8A-8B, In some implementations, at least a portion of an outer wall 305 of the fuel canister 300 may be made of an optically transparent, or translucent material such as, for example, a polycarbonate, polyvinyl chloride, chlorinated polyvinyl chloride, and like materials. This may allow a level of fuel in the fuel canister 300 to be visually detected. Visual detection of the amount of fuel in the fuel canister 300 may allow the user to determine how much equipment operation time remains before the fuel canister 300 will have to be replaced and/or refilled, allowing the user to more accurately schedule tasking, plan work flow and the like. Similarly, visual detection of the amount of fuel in the fuel canister 300 may allow the user to determine when the fuel canister 300 has reached a desired fill level during the refilling process on the fuel transfer station 100, also preventing over-filling of the fuel canister 300. In some implementations, essentially the entirety of the outer wall 305 of the fuel canister 300 may be made of a transparent, or translucent material, as shown in FIG. 8A. In some implementations, one or more previously defined portions of the outer wall 305 of the fuel canister 300 may be made of a transparent, or translucent material, defining windows 315 providing for visibility into the interior of the fuel canister 300 through which a fuel level may be visually detected, as shown in FIG. 8B. In some implementations, portions of the outer wall of the fuel canister 300 may be covered by a sleeve 325, or over-mold 325 to, for example, improve handling and installation, while leaving other portions of the transparent, or translucent outer wall 305 of the fuel canister 300 exposed, as shown in FIG. 8C, so that a fuel level in the interior of the fuel canister 300 may be visually detected. In some implementations, a fuel canister 300 having an outer wall 305 made of a transparent, or translucent material as described above may be designed to provide for pressure relief through, for example, controlled cracking at a particular pressure differential versus atmospheric pressure, thus enhancing safety when filling and maintaining a pressurized fluid in the fuel canister 300. Use of these types of materials in the outer wall 305 of the fuel canister 300 may also provide advantages in cost and/or weight when compared to metals used in pressure vessels.

In some situations, fuel may exist in the fuel canister 300 in a liquid and gaseous mixture. Particularly, in the case of propane fuel, propane may have a relatively high vapor pressure and may be subject to volume change due to varying density n accordance with changes in environmental conditions such as temperature, causing the fluid volume in the fuel canister 300 to expand or contract in response. Over-fill protection, included in the design of the fuel canister 300 may help alleviate these effects, providing a measure of safety against a failure, or burst of the pressure vessel defined by the fuel canister 300. In some implementations, a compressible material may be incorporated into the fuel canister 300, to account for expansion of the fuel contained in the fuel canister due to environmental changes. For example, a compressible material 310 such as, for example, a compressible rubber, a compressible polymer, and the like, may be incorporated into the fuel canister 300, as shown in FIGS. 9A-9E.

Figure 9C:
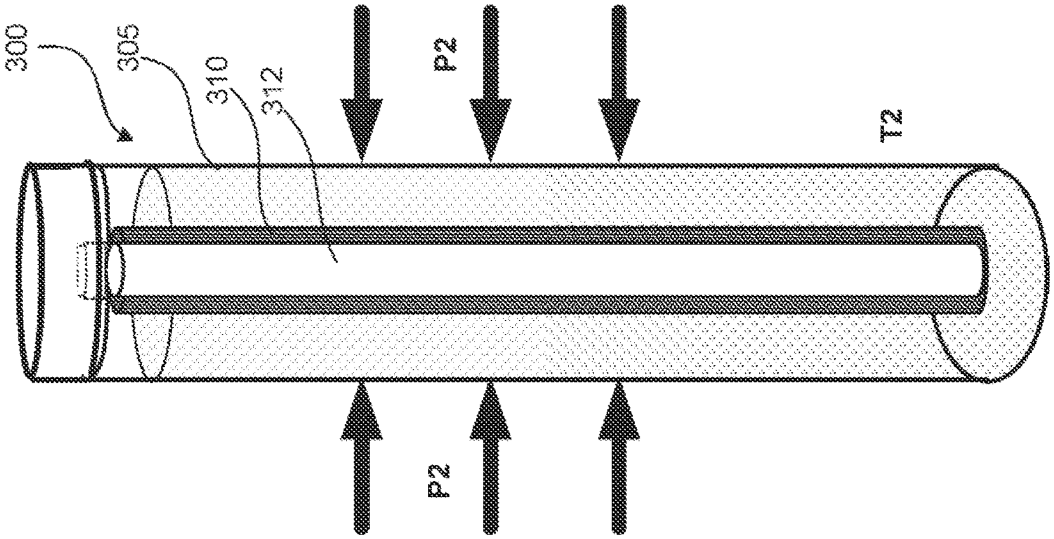
FIGS. 9A-9F illustrate example refillable fuel canisters including compressible materials, in accordance with implementations described herein.
Figure 9B:
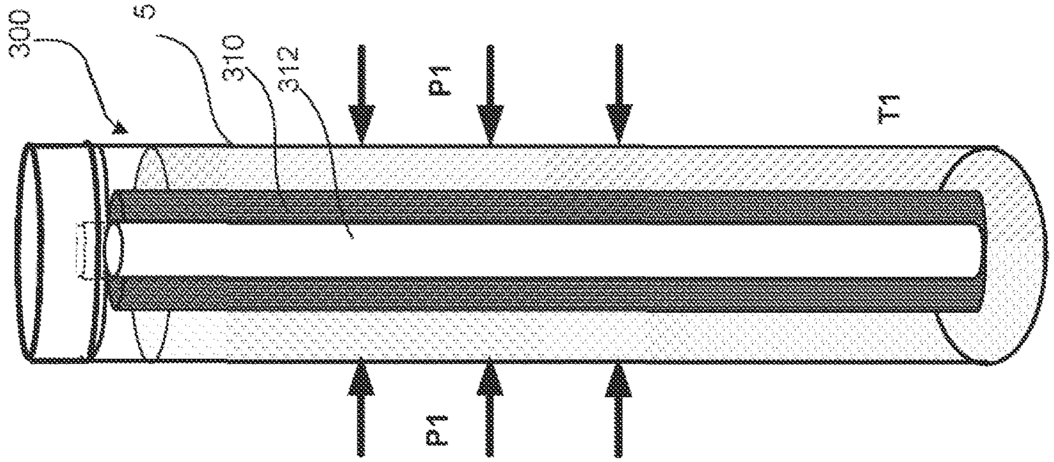
Figure 9A:
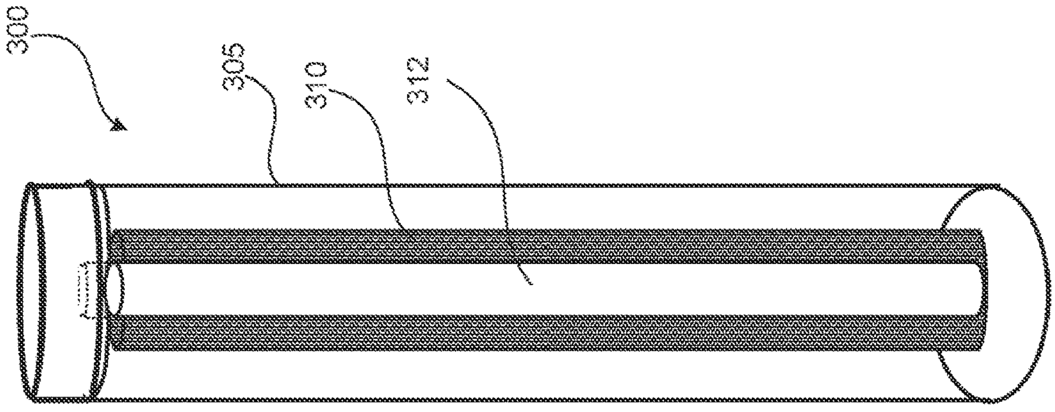

In the example shown in FIGS. 9A-9C, the compressible material 310 is positioned on an outer circumferential portion of a dip tube 312 inside the fuel canister 300. In this example, the compressible material 310 is in the form of pieces, or strips, or masses, of compressible material 310 surrounding, or partially surrounding, the dip tube 312. An empty fuel canister 300, as shown in FIG. 9A, may be filled with fuel, for example, from the fuel transfer station 100 as described above, at a first temperature Ti. At the first temperature T1, the fluid in the fuel canister is at a first pressure P1, as shown in FIG. 9B. Elevation of the temperature to a second temperature T2 (greater than the first temperature T1) may cause the fluid in the fuel canister 300 to expand, so that the fluid is at a second pressure P2 (greater than the first pressure P1). In response to the elevated pressure P2, the compressible material 310 may contract. This contracting of the compressible material 310 increases the volume inside the fuel canister 300, making this additional volume available to absorb the expansion of the fluid in the fuel canister 300 due to the elevated pressure, thus avoiding an over pressure condition, or an over fill condition, which may cause a safety hazard.

Figure 9D:
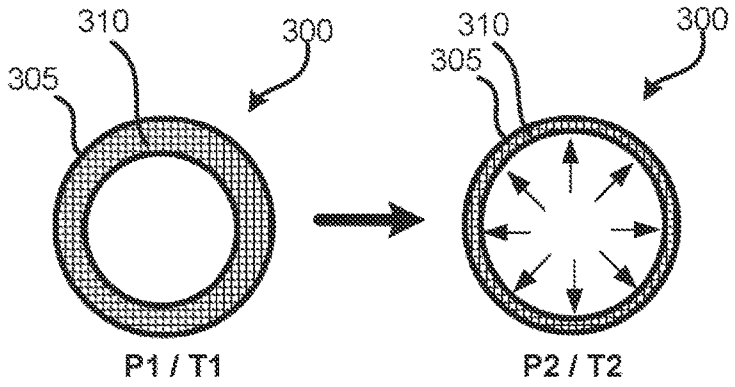
Figure 9E:
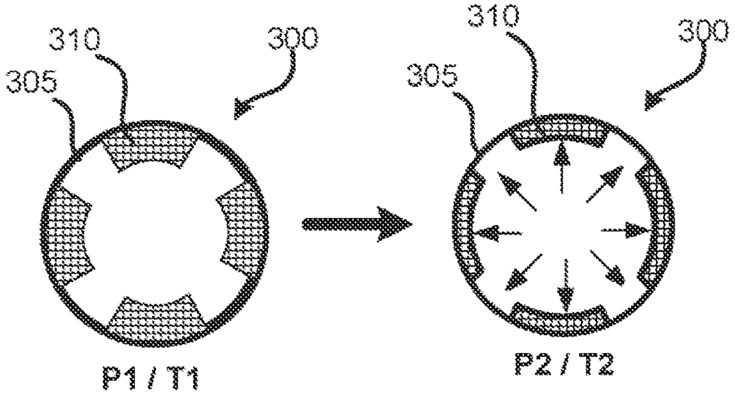
Figure 9F:
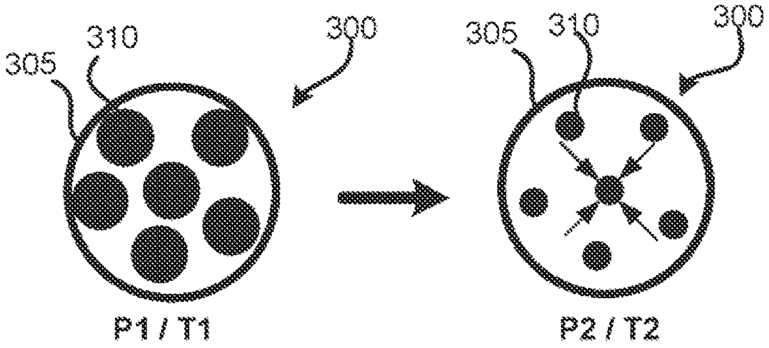

FIGS. 9D-9F are cross sectional views of the fuel canister 300, with compressible material 310 in the interior of the fuel canister 300. In the example shown in FIG. 9D, the compressible material 310 is positioned along an inner circumferential surface of the fuel canister 300. In the example shown in FIG. 9E, portions, or pieces, or strips, of the compressible material 310 are positioned intermittently along the inner circumferential surface of the fuel canister 300. In the example shown in FIG. 9F, the compressible material 310 is in the form of spherical balls or discs in the interior of the fuel canister 300. However, the compressible material 310 may be in the form of other types of three-dimensional masses having different shapes and/or contours, and are not necessarily spherical balls. In each of these examples, as the temperature and pressure increase, from T1 to T2, and from P1 to P2, respectively, the compressible material 310 in the fuel canister 300 is compressed in response to the increased pressure, providing additional volume to accommodate the corresponding expansion of the fluid in the fuel canister 300.

The compressible material may have properties that are compatible with the fuel to be contained in the fuel canister 300. The type, and configuration and/or volume of compressible material 310 may be designed so as to accommodate a previously set change in volume due to increased pressure after filling. For example, in some implementations, the type and/or configuration and/or volume of the compressible material 310 may be set to accommodate sufficient change in volumetric mass density (e.g., greater than 10%) of the fluid in the canister 300 after filling. Similarly, mechanical properties of the compressible material 310 may be taken into consideration, so that the compressible material 310 responds elastically in a relatively high pressure range (expected to be experienced from the fluid in the fuel canister 300), and continue to compress up to an expected vapor pressure before yielding.

As noted above, the use of polycarbonate, polyvinyl chloride, chlorinated polyvinyl chloride, and like materials for the outer wall 305 of the fuel canister 300. These types of materials may provide for pressure relief in the event of an over-fill, or over-pressurization condition in the fuel canister 300, through, for example, controlled cracking at a particular pressure differential. In this situation, the fuel canister 300 and material of the outer wall 305 may be such that a small crack propagates in response to a particular pressure differential, resulting in a controlled release of fuel when heated or over-pressurized, thus avoiding a comparatively violent burst or tear and sudden release of gas which may be experienced with a metal canister in a similar situation. To achieve similar effects, a burst disc, perforated side wall, or previously thinned or weakened portion of fuel canister 300 may be included to provide for preferential failure of said device during over-pressurization.

Figure 10:
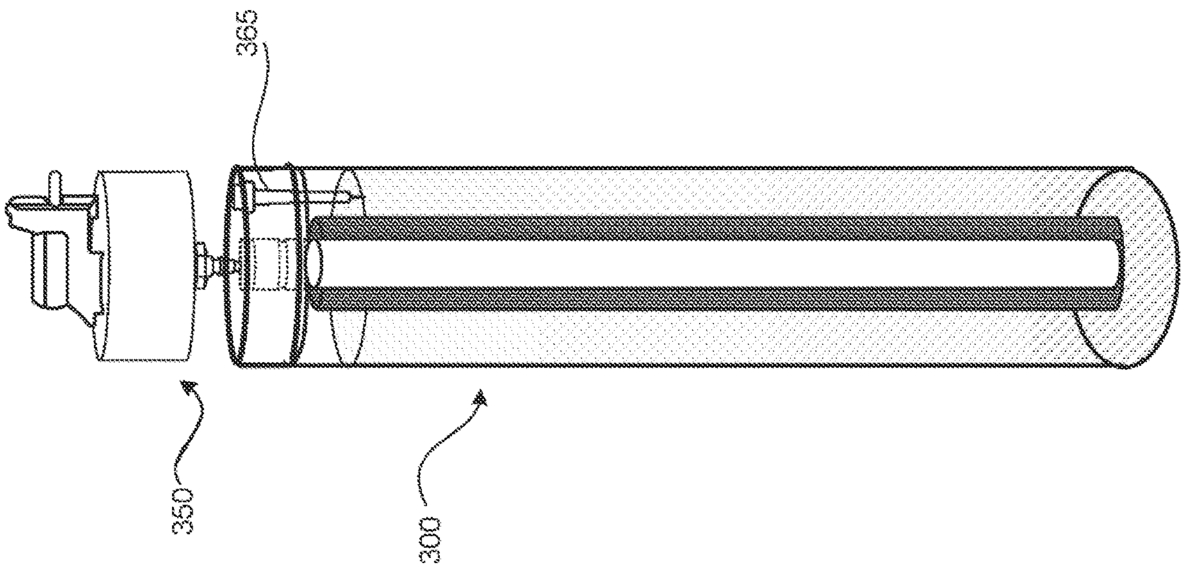
FIG. 10 illustrates an example refillable fuel canister including a pressure relief valve, in accordance with implementations described herein.

As described above, in some implementations, the fuel canister 300 may include a pressure relief valve 365. In some implementations, the pressure relief valve 365 may be included in the outer wall portion of the fuel canister, as shown in the example illustrated in FIG. 4A. In some implementations, the pressure relief valve 365 may be included in the cap 330, as shown in the example illustrated in FIG. 10. The pressure relief valve 365 may be, for example, a spring loaded poppet valve, or other similar type of valve. The pressure relief valve 365 may be actuated to provide for pressure relief in the event of over-filling, or over-pressurization. For example, the pressure relief valve 365 may be actuated in response to detection that pressure in the fuel canister 300 is greater than or equal to a previously defined pressure level. Once the pressure level in the fuel canister 300 is below the previously defined pressure level, the spring may bias the pressure relief valve 365 back to a closed state.

Figure 11:
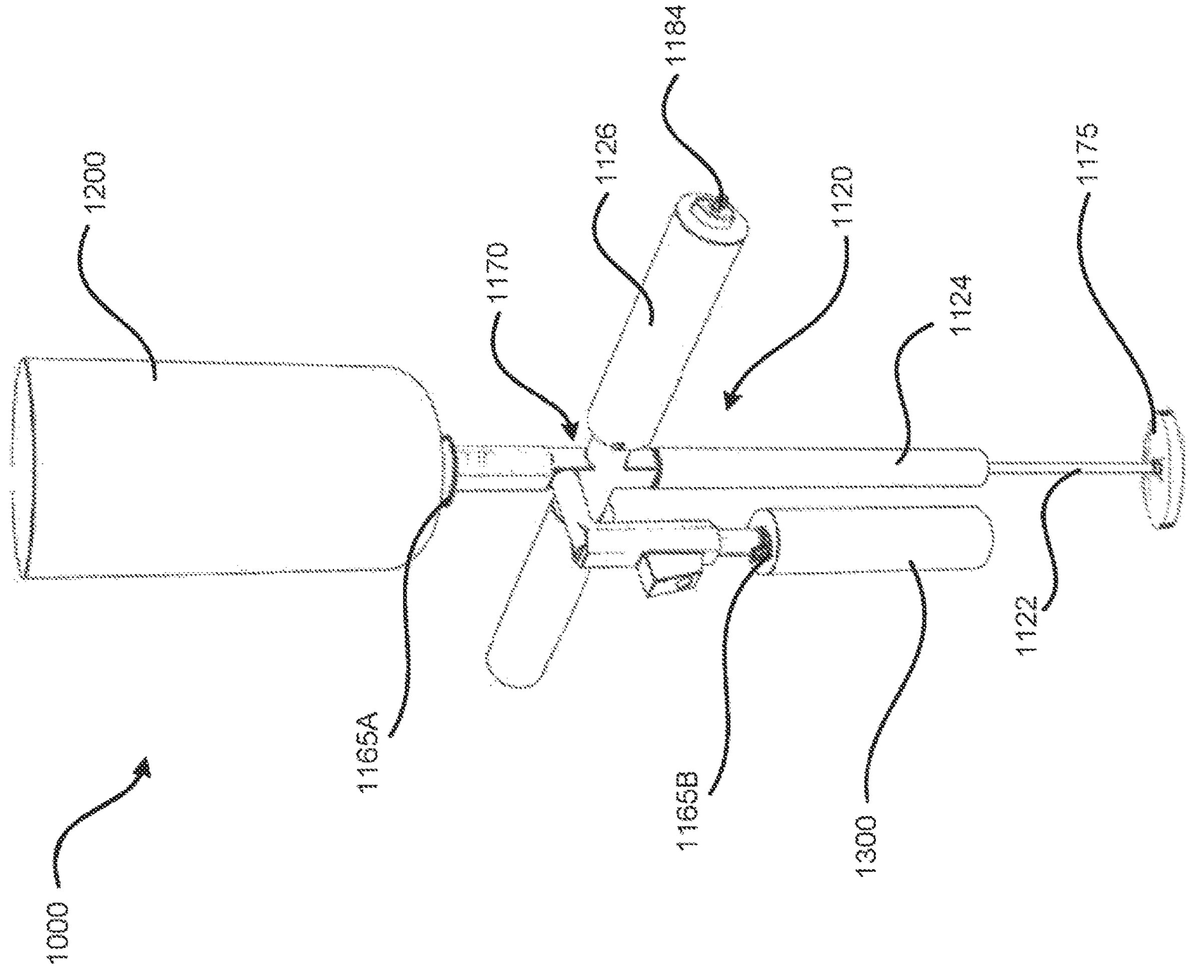
FIG. 11 illustrates a fuel transfer station, in accordance with implementations described herein.

In some situations, a smaller and/or more portable device for transferring fuel from a supply tank to a fuel canister to refill the fuel canister may further enhance utility and convenience for the user. As shown in FIG. 11, in some implementations, a fuel transfer station 1000 or device may include a pump 1120 attached to a base 1175. The base 1175 may be positioned on a support surface such as, for example, a floor surface, a work bench surface, and the like. A supply tank 1200 may be coupled to a first connection port 1165A of the frame 1170, in an inverted manner to facilitate the selective flow of fuel out of the supply tank 1200. A refillable fuel canister 1300 may be coupled to a second connection port 1165B of the frame 1170. Fluid flow lines (not shown in detail in FIG. 11) may be housed within the connecting structure, extending between the first connection port 1165A/supply tank 1200 and the second connection port 1165B/fuel canister 1300, to facilitate the selective flow of fuel from the supply tank 1200 to the fuel canister 1300. The pump 1120 may include a piston shaft 1122 having a piston (not shown in FIG. 10) at an end portion thereof that reciprocates within a cylinder 1124 in response to reciprocal movement of a handle 1126. Fluid flow lines may be defined within the frame 1170 to connect the first connection port 1165A/supply tank 1200 and the second connection port 1165B/fuel canister 1300. A first check valve (not shown in detail in FIG. 11) and a second check valve (not shown in detail in FIG. 11) may be positioned in the fluid flow lines, to selectively control the flow of fluid between the first connection port 1165A/supply tank 1200 and the second connection port 1165B/fuel canister 1300. A pressure relief valve 1184 may be in communication with the fluid flow lines, to relieve system pressure in the event of an over-filling or over-pressurization condition. With the base 1175 supported on the support surface, the user may grasp the handle 1126 and operate the pump 1120, causing fluid to flow from the supply tank 1200 to the fuel canister 1300. The flow of fluid between the first connection port 1165A/supply tank 1200 and the second connection port 1165B/fuel canister 1300 may be controlled in a similar manner previously described in detail with respect to FIGS. 1 through 10. Similarly, the features of the fuel canister 1300 and the connection thereof to the fuel transfer station 1000 via the connection port 1165B may be similar to the features of the fuel canister 300 and the connection thereof to the fuel transfer station via the connection port 165B described in detail with respect to FIGS. 1 through 10. In the fuel transfer station 1000 shown in FIG. 11, the more substantial frame 170 described above with respect to FIGS. 1-10 is replaced by rigid fluid flow lines connected to the pump 1120. The use of a relatively small supply tank 1200, for example, a one pound supply tank 1200, may allow the fuel transfer station 1000 shown in FIG. 11 to be easily transported, easily utilized, and easily stored.

Figure 12B:
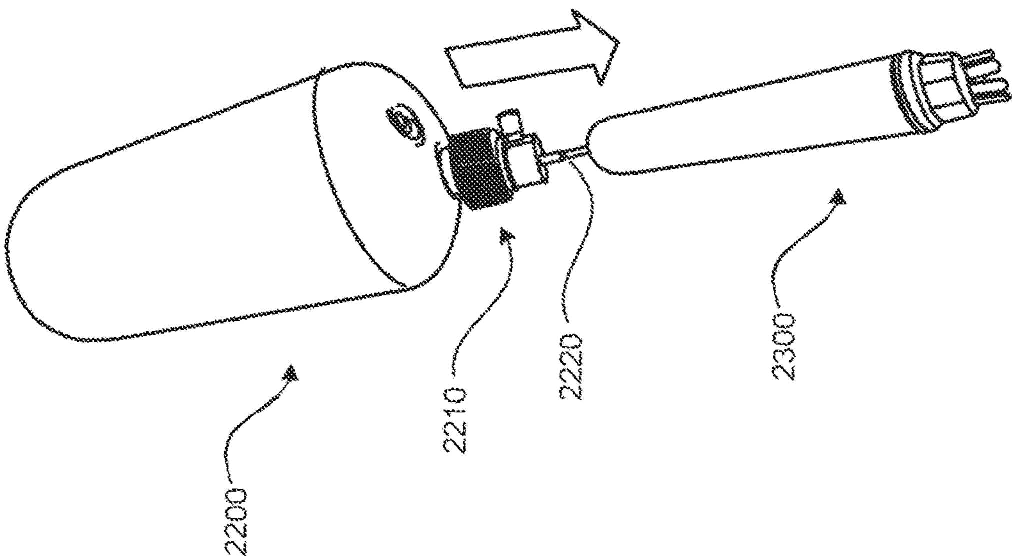
FIGS. 12A and 12B illustrate a fuel transfer station providing for connection of a refillable fuel canister to a supply canister, in accordance with implementations described herein.
Figure 12A:
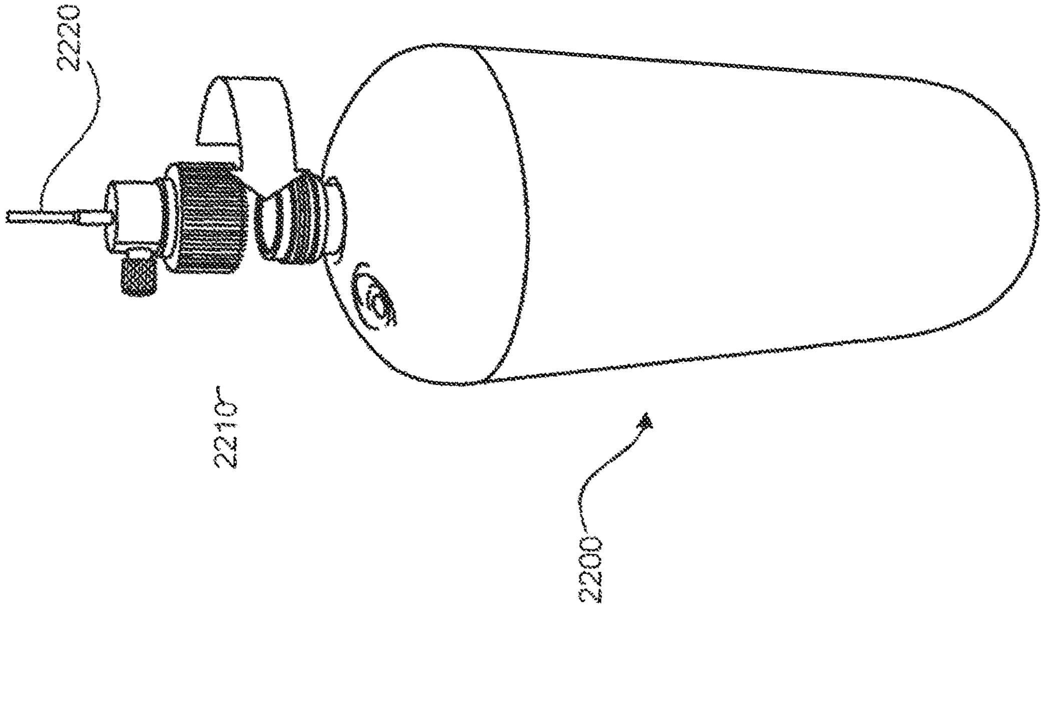

In some implementations, the transfer of fuel from a supply tank to a fuel canister to be filled may be further simplified by one or more adapters which may provide for the transfer of fuel, essentially directly, from the supply tank to the fuel canister. For example, as shown in FIGS. 12A and 12B, a fuel transfer nozzle 2210 may be coupled to a supply tank 2200. A fuel canister 2300 may then be coupled to, or connected to the supply canister 2200, such that a nozzle tip 2220 of the fuel transfer nozzle 2210 is inserted into a fill valve 2310 (see FIGS. 14A and 14B) in an end portion of the fuel canister 2300. Insertion of the nozzle tip 2220 into the fill valve 2310 and depression of the nozzle tip 2220 may actuate, or open, the fuel transfer nozzle 2210, and may actuate, or open, the fill valve 2310, allowing fuel to flow from the supply tank 2200, through the fuel transfer nozzle 2210 and the fill valve 2310, and into the fuel canister 2300. An exemplary fuel transfer nozzle 2210 will be described in more detail with respect to FIGS. 13A-13D. An exemplary fill valve 2310 will be described in more detail with respect to 14A and 14B. The insertion of the nozzle tip 2220 of the fuel transfer nozzle 2210 into the fill valve 2310, to provide for the flow of fuel from the supply tank 2200, through the fuel transfer nozzle 2210 and the fill valve 2310 and into the fuel canister 2300, is illustrated schematically in FIGS. 15A and 15B.

Figure 13B:
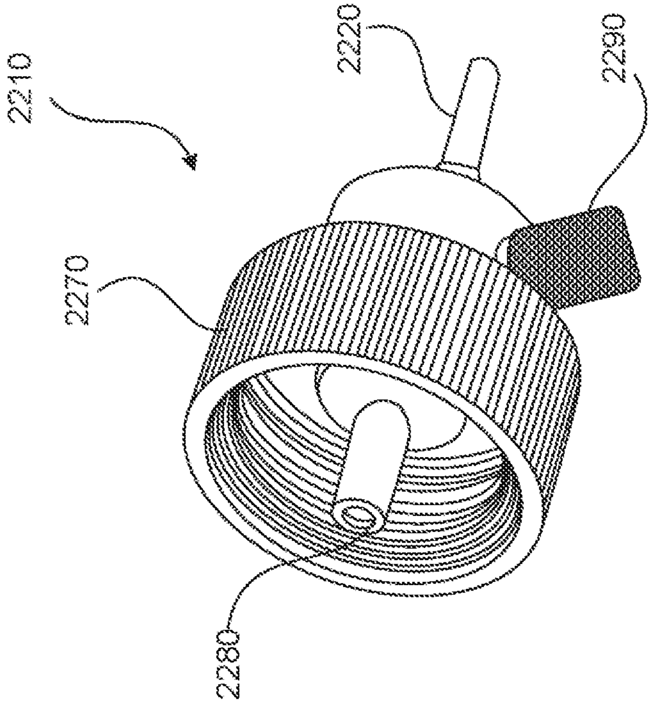
FIGS. 13A-13D illustrate a fuel transfer nozzle of the fuel transfer station shown in FIGS. 12A and 12B, in accordance with implementations described herein.
Figure 13A:
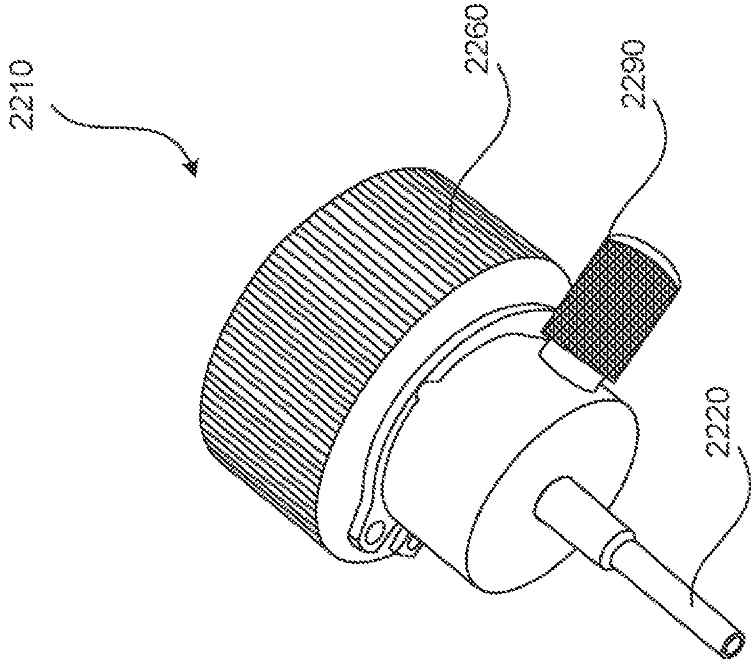
Figure 13D:
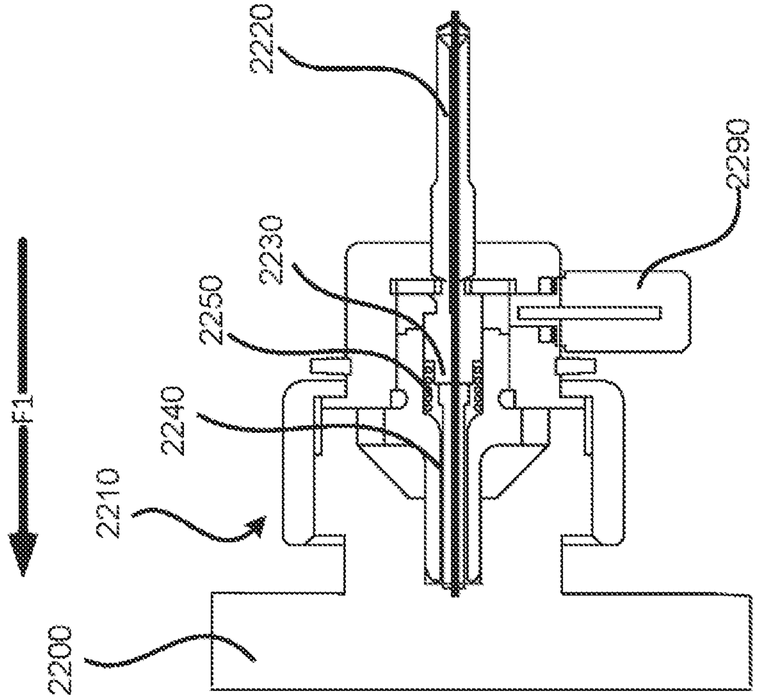
Figure 13C:
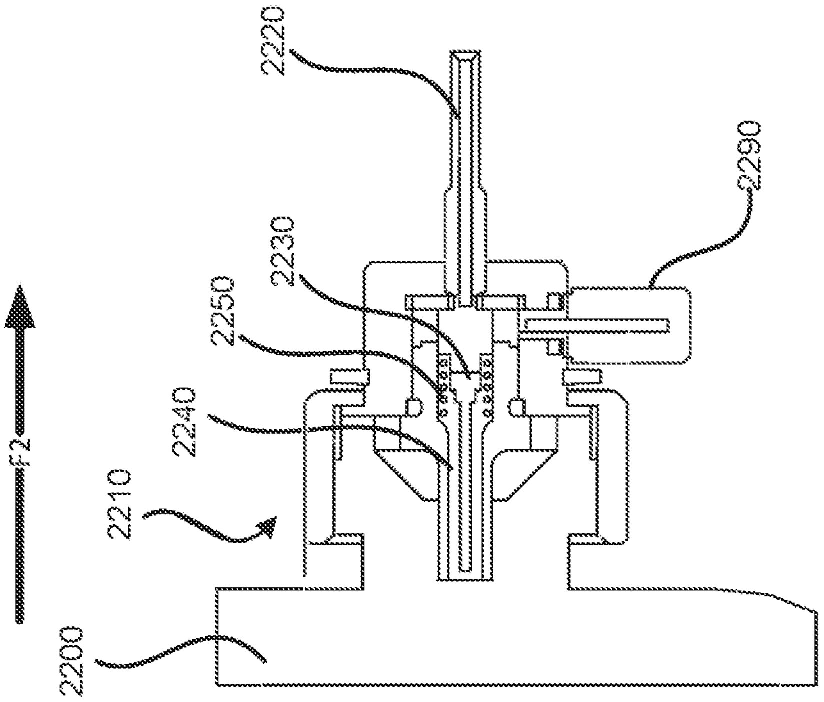
Figures 15A, 15B:
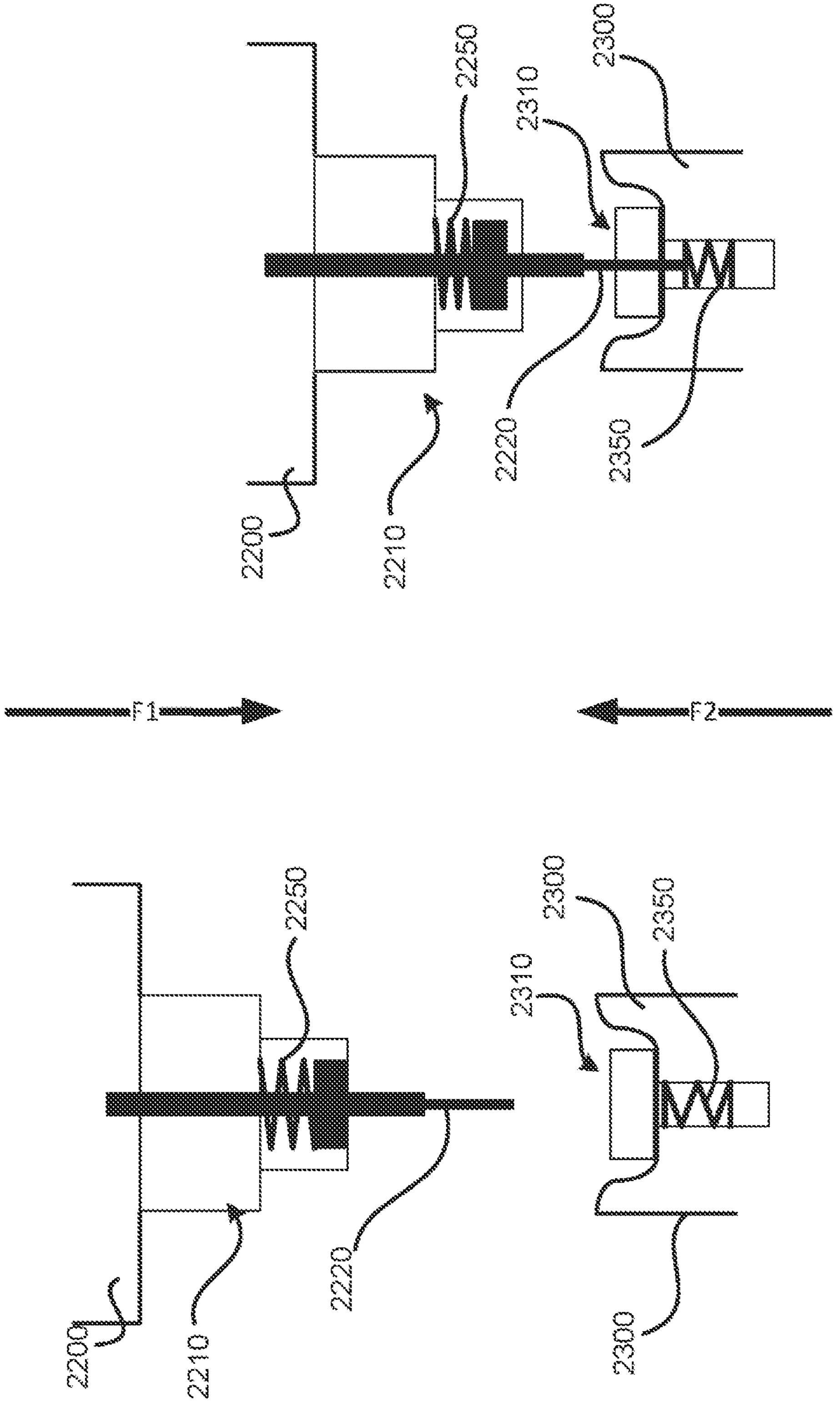
FIGS. 15A and 15B are schematic views of the fuel transfer nozzle shown in FIGS. 13A-13D, and the fill valve shown in FIGS. 14A and 14B, in accordance with implementations described herein.

FIGS. 13A and 13B are perspective views of the exemplary fuel transfer nozzle 2210, in accordance with implementations described herein. FIG. 13C is a cross sectional view of the exemplary fuel transfer nozzle 2210 in an unactuated state. FIG. 13D is a cross sectional view of the exemplary fuel transfer nozzle 2210 in an actuated state. FIG. 15A is a schematic illustration of the supply tank 2200 and the fuel canister 2300 in a disconnected state, and FIG. 15B is a schematic illustration of the supply tank 2200 and the fuel canister 2300 in a connected state, in which fuel can flow from the supply tank 2200 to the fuel canister 2300, and may be aided by the effects of gravity.

A coupler 2270 may provide for coupling, for example, threaded coupling, of the fuel transfer nozzle 2210 to an outlet port of the supply tank 2200. An inlet tip 2280 may engage an outlet flow passage of an outlet port of the supply tank 2200, to selectively allow fuel to flow from the supply tank 2200 into the fuel transfer nozzle 2210. In some implementations, the fuel transfer nozzle 2210 may include a lubrication port 2290, allowing for the periodic lubrication of the internal components of the fuel transfer nozzle 2210, and for the addition of lubricant to the fuel canister 2300. In some situations, it may be advantageous when lubricant is mixed with the fuel and/or dissolved into the fuel, as the lubricant may then be transferred from the fuel canister 300 to the attached equipment, providing lubricity as fuel is dispensed.

In the unactuated state shown in FIGS. 13C and 15A, a valve 2230 positioned in a flow path 2240 within the fuel transfer nozzle 2210 may remain closed, such that fuel does not flow from the supply tank 2200, through the flow passage 2240 and out through the nozzle tip 2220. An application of force on the nozzle tip 2220 in the direction of the arrow F1, i.e., depression of the nozzle tip 2220 in a direction into the fuel transfer nozzle 2210, may cause the valve 2230 to open, and allow fuel to flow through the fuel transfer nozzle 2210 and out through the nozzle tip 2220, as shown in FIGS. 13D and 15B. The nozzle tip 2220 may move in the direction F2, due to the biasing force of a spring 2250 at the end portion of the nozzle tip 2220, in response to removal of the force applied to the nozzle tip 2220 (for example, removal of the nozzle tip 2220 from the fill valve 2310), closing the valve 2230 and returning the fuel transfer nozzle 2210 to the unactuated state shown in FIG. 13C.

As shown in FIG. 15B, insertion of the nozzle tip 2220 into the fill valve 2310 compresses the spring 2250 of the fuel transfer nozzle 2310 and the spring 2350 of the fill valve 2310, allowing fuel to flow from the supply tank 2200 into the fuel canister 2300. Removal of the nozzle tip 2220 from the fill valve 2310 releases the spring 2250 of the fuel transfer nozzle 2310 such that fuel no longer flows through the fuel transfer nozzle 2310, and releases the spring 2350 of the fill valve 2310, such that fuel no longer flows through the fill valve. In some implementations, it may be advantageous that the nozzle tip 2220 not create a gas tight seal with the fill valve 2320, such that some gas pressure may be relieved as liquid fuel is transferred.

Figure 14B:
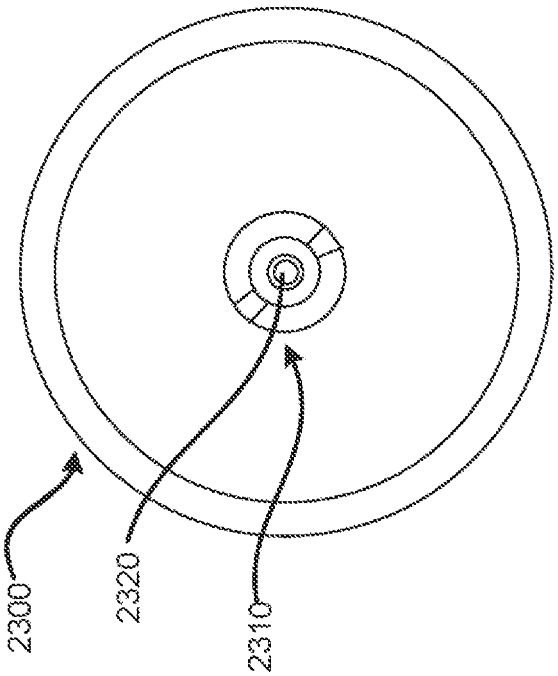
FIGS. 14A and 14B illustrate a fill valve of the fuel transfer station shown in FIGS. 12A and 12B, in accordance with implementations described herein.
Figure 14A:
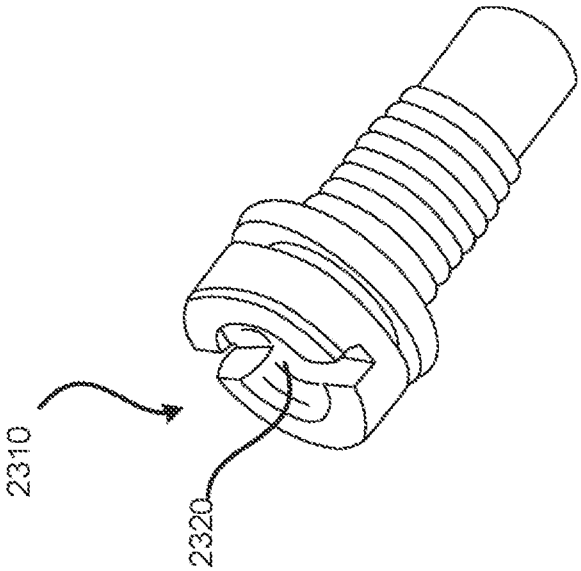

FIG. 14A is a perspective view of an exemplary fill valve 2310, and FIG. 14B is a bottom view of an exemplary fuel canister 2300, in accordance with implementations described herein. As shown in 14A and 14B, the fill valve 2310 may be installed in an end portion, for example, a base portion, of the fuel canister 2300. The fill valve 2310 may include an inlet portion 2320 that receives the nozzle tip 2220 of the fuel transfer adapter 2210. The fill valve 2310 may be selectively actuated by the spring 2250, to allow fuel to selectively flow through the fill valve 2310 and into the fuel canister 2300. When the nozzle tip 2220 of the fuel transfer nozzle 2210 is received in the inlet portion 2320 of the fill valve 2310, and a force is applied to overcome the applicable spring and gas pressure forces, as shown in FIG. 15B, both the valve 2230 of the fuel transfer nozzle 2210 and the fill valve 2310 of the fuel canister 2300 may be open. With both valves 2230, 2310 in the open position, fuel may flow from the supply tank 2200 to the fuel canister 2300.

In some implementations, the flow of fuel from the supply tank 2200 to the fuel canister 2300 may be facilitated by the force of gravity (based on, for example, a relative positioning of the supply tank 2200 in a somewhat inverted position above the fuel canister 2300), as illustrated in the relative orientation of the supply tank 2200 and the fuel canister 2300 shown in FIGS. 15A and 15B.

The exemplary fuel transfer system shown in FIGS. 12A-15B may provide for provide a simplified mechanism for fuel transfer, and may simplify the filling of an individual fuel canister, particularly in a usage environment in which time and/or space and/or equipment availability are limited.

However, in some situations, it may be difficult to achieve a substantially complete filling of the fuel canister 2300 using the exemplary fuel transfer system shown in FIGS. 12A-15B. In situations in which such a smaller, inline type fuel transfer system may be desired, a fuel transfer station, in accordance with implementations described herein, may include a manual inline pumping system including as few as one single check valve, as illustrated in FIGS. 16A-17B. Such a fuel transfer system including an inline pumping system may provide for essentially complete filling of the fuel canister, in a relatively compact form, while utilizing a reduced number of parts.

Figure 16A:
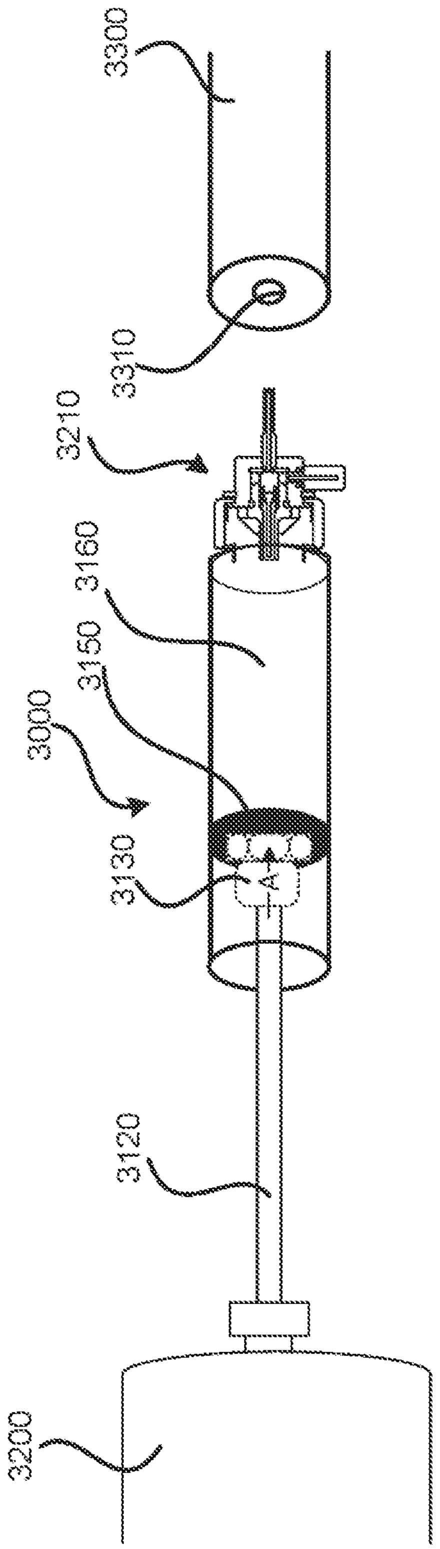
FIGS. 16A and 16B illustrate a fuel transfer station including an inline fuel transfer pump, in accordance with implementations described herein.
Figure 16B:
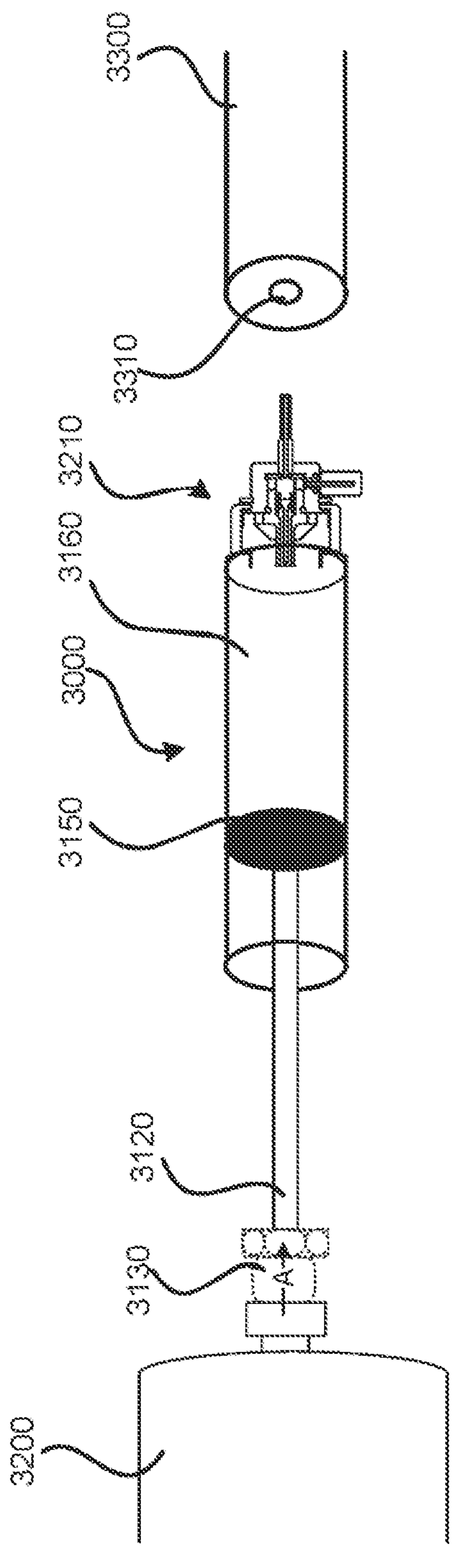

As shown in FIGS. 16A and 16B, a fuel transfer station, in accordance with implementations described herein, may include an inline fuel transfer pump 3000 connected between the supply tank 3200 and the fuel canister 3300. In some implementations, a single check valve 3130 may be installed along an inlet portion 3120 of the inline fuel transfer pump 3000. For example, in some implementations, the single check valve 3130 may be coupled between the inlet portion 3120 and a piston 3150 of the inline transfer pump 3000, as shown in FIG. 16A. In some implementations, the single check valve 3130 may be coupled at a connection between the supply tank 3200 and the inlet portion 3120 of the inline transfer pump 3000, as shown in FIG. 16B. In either of the exemplary installation positions shown in FIGS. 16A and 16B, the single check valve 3130 may allow for flow in a single direction, for example in the direction of the arrow A. That is, in either of the exemplary arrangements illustrated in FIGS. 16A and 16B, the single check valve 3130 may only allow fuel to flow from the supply tank 3200 to the fuel canister 3300.

The manual inline transfer pump 3000 may include the piston 3150 reciprocally received in a cylinder 3160. The inlet portion 3120 may be coupled between the outlet of the supply tank 3200 and the piston 3150, to direct fuel from the supply tank 3200 into an interior of the cylinder 3160. A fuel transfer nozzle 3220 may be coupled to an outlet end portion of the cylinder 3160. The fuel transfer nozzle 3210 may be selectively engaged with a fill valve 3310 provided in an end portion of the fuel canister 3300, so as to selectively direct fuel from the interior of the cylinder 3160 into the fuel canister 3300.

In some implementations, the fuel transfer nozzle 3210 described with respect to FIGS. 16A-17B may be similar to the fuel transfer nozzle 2210 described above with respect to FIGS. 12A-15B. In some implementations, the fill valve 3310 described with respect to FIGS. 16A-17B may be similar to the fill valve 2210 described above with respect to FIGS. 12A-15B.

Figure 17A:
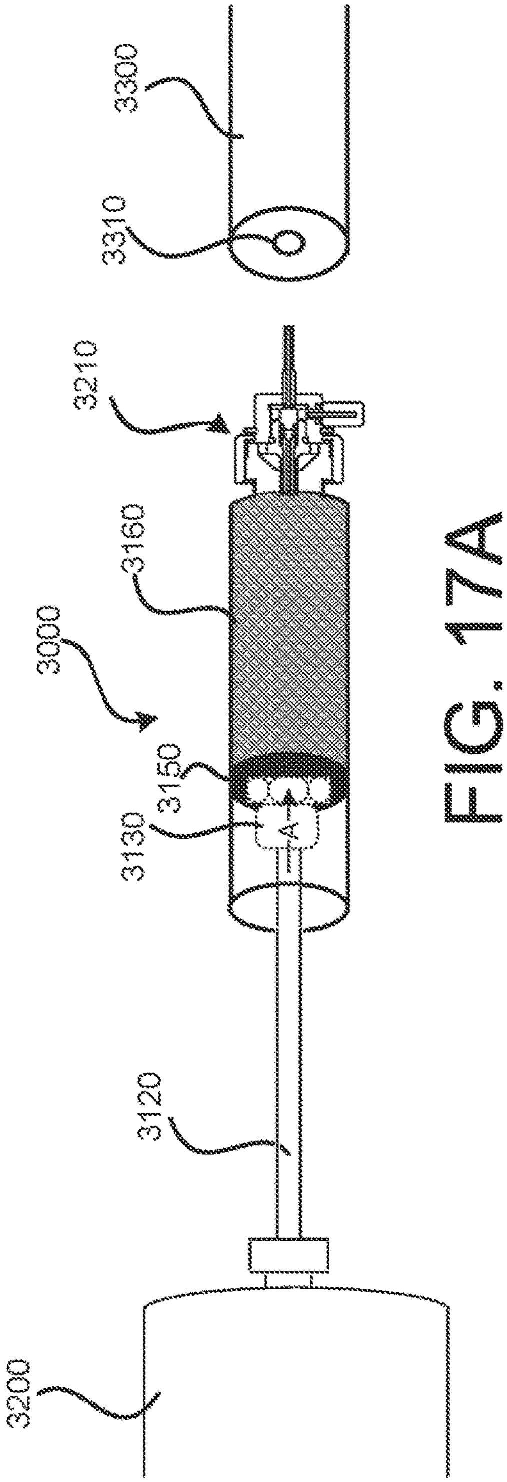
FIGS. 17A and 17B illustrate operation of the manual inline fuel transfer pump shown in FIGS. 16A and 16B, in accordance with implementations described herein.
Figure 17B:
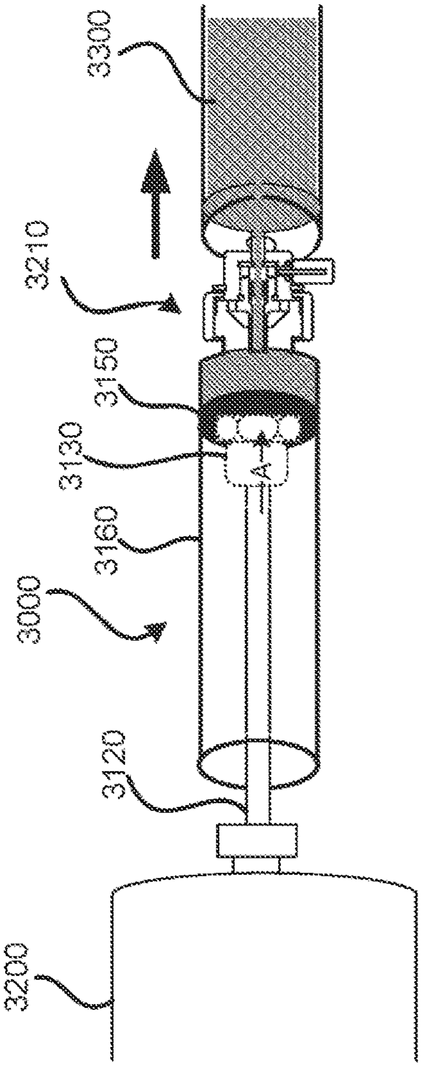

In the exemplary arrangement shown in FIG. 17A, the inline fuel transfer pump 3000 is in a first state. In the first state, the fuel transfer pump 3000 is connected to the supply tank 3200, and is fully extended due to the pressure exerted by the fluid contained in the supply tank 3200, and flowing out of the supply tank 3200 and into the inlet portion 3120 of the pump 3000. In the exemplary arrangement shown in FIG. 17B, the inline fuel transfer pump 3000 is in a second state. In the second state, the pump 3000 has been compressed, pushing fuel contained within the interior of the cylinder 3160 out through the fuel transfer nozzle 3210, and into the fuel canister 3300 through the fill valve 3310. That is, in transitioning from the first state to the second state, the piston 3150 moves, or reciprocates, within the cylinder 3160 (i.e., the piston 3150 is manually pumped, or moved, within the cylinder 3160) to eject the fuel contained within the cylinder 3160 out of the pump 3000 through the fuel transfer nozzle 3210, and into the fuel canister 3300 through the fill valve 3310.

A reciprocating action, for example, a manual reciprocating action, or reciprocal may be applied to the pump 3000 to cause a corresponding reciprocal movement of the piston 3150 in the cylinder 3160 to draw fuel from the supply tank 3200 into the cylinder 3160 in a first direction, and to draw fuel out of the cylinder 3160 and into the fuel canister 3300 in a second direction. This reciprocating action may be repeated, and the fuel transferred out of the pump 3000 and refilled into the pump 3000, in this manner until the fuel canister 3300 is filled. The check valve 3130 may prevent the supply tank 3200 from being pressurized due to this reciprocal action. Rather, only the outlet portion of the pump 3000 (i.e., at the fuel transfer nozzle 3210) is pressurized.

In some implementations, the flow of fuel from the supply tank 3200 to the fuel canister 3300 may be facilitated by the force of gravity (based on, for example, a relative positioning of the supply tank 3200 in a somewhat inverted position above the fuel canister 3300).

The exemplary check valve 3130 included in the fuel transfer station including the inline pumping system 3000 shown in FIGS. 16A-17B is just one illustrative example of a check valve that may be incorporated into a fuel transfer station, in accordance with implementations described herein. Other check valves capable of controlling the flow of fluid between a supply tank and a fuel canister to be filled may also be appropriate.

The exemplary fuel transfer system shown in FIGS. 16A-17B may provide a simplified mechanism for fuel transfer, and may simplify the filling of an individual fuel canister, particularly in a usage environment in which power, such as, for example, electrical power, time and/or space and/or equipment availability are limited.

A refillable fuel cell, or fuel canister, and a fuel transfer station for filling such a refillable fuel canister, in accordance with implementations described herein, may allow a fuel canister to be refilled with fuel, rather than discarded. The transfer station may accommodate a wide variety of different sizes and/or capacities and/or types of refillable fuel canisters to be refilled, for example, with fuel in a liquid state such as, for example, propane. This may allow for the use of this type of fuel to provide power to a wide variety of combustion powered equipment, and may allow for the operation of this equipment at a wide variety of job sites, including indoor job sites which would otherwise restrict the use of gasoline or traditional combustion powered equipment. The ability to refill fuel canisters may enhance user utility and convenience, and reduce cost and waste associated with the use of combustion powered equipment while improving environmental health and safety risks. Other non-combustion energy generation and/or energy transfer devices, such as, for example, electrochemical cells, refrigerant pumps and the like, may also benefit from a refillable fuel canister.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A fuel transfer station, comprising:

a first connection port;

a second connection port;

a fluid flow having an inlet portion proximate the first connection port and an outlet portion proximate the second connection port;

a first coupler configured to detachably couple a supply tank to the fluid flow line at the first connection port;

a second coupler configured to detachably couple a refillable fuel canister to the fluid flow line at the second connection port;

a first check valve at the inlet portion of the fluid flow line;

a second check valve at the outlet portion of the fluid flow line; and a pump in fluid communication with the fluid flow line, so as to selectively pressurize the fluid flow line, characterized in that the fluid flow line connects the first connection port and the second connection port, and in that the first check valve is positioned between the supply tank and the pump and the second check valve is positioned between the pump and the fuel canister.

2. The fuel transfer station of claim 1, further comprising a pressure relief valve provided in the fluid flow line, between the first check valve and the second check valve, and configured to selectively release pressure from the fluid flow line in response to detection of a pressure in the fluid flow line that is greater than or equal to a previously defined pressure level, the previously defined pressure level corresponding to an overfill point of the refillable fuel canister.

3. The fuel transfer station of claim 1, wherein the first connection port and the first coupler are configured to detachably couple a plurality of different supply tanks to the fluid flow line, the plurality of different supply tanks having different capacities.

4. The fuel transfer station of claim 1, wherein the second connection port and the second coupler are configured to detachably couple a plurality of different fuel canisters to the fluid flow line, the plurality of different fuel canisters having different capacities.

5. The fuel transfer station of claim 1, wherein the second connection port includes a keying feature, the keying feature including a contoured inner section defined on an inner peripheral portion of the second connection port, the contoured inner section having a contour corresponding to a contour of a contoured outer section defined on a corresponding outer peripheral portion of the fuel canister.

6. The fuel transfer station of claim 5, wherein alignment of the contoured outer section of the fuel canister with the contoured inner section of the second connection port defines an insertion orientation for coupling the fuel canister in the second connection port.

7. The fuel transfer station of claim 1, wherein the second connection port includes a keying feature, the keying feature including a contoured inner section defined on an inner peripheral portion of the second connection port, the contoured inner section being configured to selectively engage with a movable release pad on a corresponding outer peripheral portion of the fuel canister.

8. The fuel transfer station of claim 7, further comprising a release mechanism extending into the second connection port, the release mechanism including: a release arm; and a release button at a proximal end portion of the release arm, wherein a distal end portion of the release arm is configured to depress the release pad on the outer peripheral portion of the fuel canister in response to actuation of the release button at the proximal end portion of the release arm, releasing engagement of the contoured inner section and the release pad to release the fuel canister from the first connection port.

9. A fuel transfer station, comprising:

a first connection port;

a second connection port;

a fluid flow having an inlet portion proximate the first connection port and an outlet portion proximate the second connection port;

a first coupler configured to detachably couple a supply tank to the fluid flow line at the first connection port;

a second coupler configured to detachably couple a refillable fuel canister to the fluid flow line at the second connection port;

a first check valve at the inlet portion of the fluid flow line;

a second check valve at the outlet portion of the fluid flow line; and a thermal device having a thermal jacket that is detachably coupled to the supply tank.

10. The fuel transfer station of claim 9, further comprising a pressure relief valve provided in the fluid flow line, between the first check valve and the second check valve, and configured to selectively release pressure from the fluid flow line in response to detection of a pressure in the fluid flow line that is greater than or equal to a previously defined pressure level, the previously defined pressure level corresponding to an overfill point of the refillable fuel canister.

11. The fuel transfer station of claim 9, wherein the first connection port and the first coupler are configured to detachably couple a plurality of different supply tanks to the fluid flow line, the plurality of different supply tanks having different capacities.

12. The fuel transfer station of claim 9, wherein the second connection port and the second coupler are configured to detachably couple a plurality of different fuel canisters to the fluid flow line, the plurality of different fuel canisters having different capacities.

13. The fuel transfer station of claim 9, wherein the second connection port includes a keying feature, the keying feature including a contoured inner section defined on an inner peripheral portion of the second connection port, the contoured inner section having a contour corresponding to a contour of a contoured outer section defined on a corresponding outer peripheral portion of the fuel canister.

14. The fuel transfer station of claim 13, wherein alignment of the contoured outer section of the fuel canister with the contoured inner section of the second connection port defines an insertion orientation for coupling the fuel canister in the second connection port.

15. The fuel transfer station of claim 9, wherein the second connection port includes a keying feature, the keying feature including a contoured inner section defined on an inner peripheral portion of the second connection port, the contoured inner section being configured to selectively engage with a movable release pad on a corresponding outer peripheral portion of the fuel canister.

16. The fuel transfer station of claim 15, further comprising a release mechanism extending into the second connection port, the release mechanism including: a release arm; and a release button at a proximal end portion of the release arm, wherein a distal end portion of the release arm is configured to depress the release pad on the outer peripheral portion of the fuel canister in response to actuation of the release button at the proximal end portion of the release arm, releasing engagement of the contoured inner section and the release pad to release the fuel canister from the first connection port.

17. The fuel transfer station of claim 9, wherein the thermal device having the thermal jacket is detachably coupled to the refillable fuel canister.

18. A refillable fuel canister, comprising:

a canister body, wherein at least a portion of the canister body is translucent such that an interior of the fuel canister is visible through the translucent portion of the canister body;

a cap portion coupled to an end portion of the canister body;

an adapter removably coupled to the cap portion;

wherein the adapter includes a quick disconnect coupler, the quick disconnect coupler being configured to couple and decouple the adapter and the cap.

* * * * *